(12) United States Patent
Muhammad et al.

(10) Patent No.: US 10,900,557 B2
(45) Date of Patent: Jan. 26, 2021

(54) HEAT EXCHANGER ASSEMBLY WITH INTEGRATED VALVE WITH PRESSURE RELIEF FEATURE FOR HOT AND COLD FLUIDS

(71) Applicant: Dana Canada Corporation, Oakville (CA)

(72) Inventors: Anis Muhammad, Oakville (CA); Silvio Tonellato, Oakville (CA)

(73) Assignee: Dana Canada Corporation, Oakville (CA)

( * ) Notice: Subject to any disclaimer, the term of this patent is extended or adjusted under 35 U.S.C. 154(b) by 184 days.

(21) Appl. No.: 16/189,166

(22) Filed: Nov. 13, 2018

(65) Prior Publication Data

US 2020/0149623 A1 May 14, 2020

(51) Int. Cl.
*F16H 57/04* (2010.01)
*F01P 11/08* (2006.01)
(Continued)

(52) U.S. Cl.
CPC ......... *F16H 57/0413* (2013.01); *F01M 5/001* (2013.01); *F01M 5/007* (2013.01); *F01P 5/10* (2013.01); *F01P 11/08* (2013.01); *F16H 57/0475* (2013.01); *F28D 9/005* (2013.01); *F28F 9/026* (2013.01); *F28F 27/02* (2013.01)

(58) Field of Classification Search
CPC .... F16H 57/0413; F01M 5/001; F01M 5/007; F01P 5/10; F01P 11/08
See application file for complete search history.

(56) References Cited

U.S. PATENT DOCUMENTS 208,986 A 10/1878 Patterson
290,450 A 12/1883 Medden
(Continued)

FOREIGN PATENT DOCUMENTS

CN 207212474 U 4/2018
CN 207333009 U 5/2018
(Continued)

OTHER PUBLICATIONS

Crane Catalogue, Section 2, Bronze Valves, pp. 2-27 and 2-29, May 1961.
(Continued)

*Primary Examiner* — Kevin A Lathers
(74) *Attorney, Agent, or Firm* — Ridout & Maybee LLP

(57) ABSTRACT

An assembly includes a valve integration unit attached to a transmission oil heater. The valve integration unit includes a valve mechanism and a housing having first to sixth fluid ports for oil input and output. The interior space of the housing has three portions, including a second portion defining a valve chamber and a third portion defining a bypass flow passage between the first and second portions. The valve mechanism has a temperature responsive actuator and first, second and third valve members. The movement of the first and second valve members is actuated by the temperature responsive actuator. The third valve member and the third valve opening are located in the second portion of the interior space. The third valve member is actuatable in response to a pressure differential between the first and second portions of the interior space.

19 Claims, 25 Drawing Sheets

(51) Int. Cl.
*F01P 5/10* (2006.01)
*F01M 5/00* (2006.01)
*F28F 27/02* (2006.01)
*F28D 9/00* (2006.01)
*F28F 9/02* (2006.01)

(56) References Cited

U.S. PATENT DOCUMENTS

| | | |
|---|---|---|
| 320,280 A | 6/1885 | Pearson |
| 417,136 A | 12/1889 | Bell |
| 424,199 A | 3/1890 | Haskell |
| 674,674 A | 5/1901 | Fernald |
| 809,603 A | 1/1906 | Barr |
| 967,820 A | 8/1910 | Nachtigall |
| 1,457,937 A | 6/1923 | Reynolds |
| 1,648,124 A | 11/1927 | Hopkins |
| 1,740,420 A | 12/1929 | Friedman |
| 1,807,594 A | 6/1931 | Hopkins |
| 1,843,953 A | 2/1932 | McKinney |
| 1,937,246 A | 11/1933 | Reedy |
| 1,939,128 A | 12/1933 | Gerhard |
| 1,942,417 A | 1/1934 | Ferlin |
| 1,991,052 A | 2/1935 | Derby |
| 2,159,468 A | 5/1939 | Young |
| 2,396,053 A | 3/1946 | McEntire |
| 2,433,454 A | 12/1947 | Hoffman |
| 2,469,212 A | 5/1949 | Shaw |
| 2,865,594 A | 12/1958 | Winfree |
| 3,034,571 A | 5/1962 | Matthews |
| 3,145,968 A | 8/1964 | Marx |
| 3,155,367 A | 11/1964 | Gifford |
| 3,282,554 A | 11/1966 | Jones |
| 3,404,837 A | 10/1968 | James |
| 3,412,756 A | 11/1968 | Shore |
| 3,414,232 A | 12/1968 | Hellman |
| 3,440,833 A | 4/1969 | Fernandes |
| 3,519,245 A | 7/1970 | Hyde |
| 3,558,098 A | 1/1971 | Puster |
| 3,572,631 A | 3/1971 | Ritchart |
| 3,754,706 A | 8/1973 | Tao |
| 3,779,306 A | 12/1973 | Wilson |
| 3,926,204 A | 12/1975 | Earl |
| 3,943,970 A | 3/1976 | Knapp |
| 3,952,764 A | 4/1976 | Keller, III |
| 4,024,909 A | 5/1977 | Hofmann, Jr. |
| 4,056,119 A | 11/1977 | Allen |
| 4,089,504 A | 5/1978 | Giuliani |
| 4,114,571 A | 9/1978 | Ruf |
| 4,469,275 A | 9/1984 | Desalve |
| 4,508,132 A | 4/1985 | Mayfield, Jr. |
| 4,527,681 A | 7/1985 | Sommer |
| 4,550,896 A | 11/1985 | Hansen, III |
| 4,574,836 A | 3/1986 | Barnard, Jr. |
| 4,669,532 A | 6/1987 | Tejima |
| 4,759,331 A | 7/1988 | Sausner |
| 4,846,219 A | 7/1989 | Schaefer |
| 5,085,468 A | 2/1992 | Billotte |
| 5,108,071 A | 4/1992 | Hutchings |
| 5,217,200 A | 6/1993 | Hutchings |
| 5,303,734 A | 4/1994 | Eidsmore |
| 5,401,087 A | 3/1995 | Goossens |
| 5,423,373 A | 6/1995 | Ramberg |
| 5,425,397 A | 6/1995 | Mackal |
| 5,474,107 A | 12/1995 | Hayes |
| 5,551,506 A | 9/1996 | Nishishita |
| 5,553,664 A | 9/1996 | Nishishita |
| 5,609,203 A | 3/1997 | Kinugasa |
| 5,687,756 A | 11/1997 | Vannatta |
| 5,694,975 A | 12/1997 | Eidsmore |
| 5,875,834 A | 3/1999 | Brooks |
| 5,904,292 A | 5/1999 | McIntosh |
| 5,950,589 A | 9/1999 | Armbruster |
| 5,964,282 A | 10/1999 | Seiler |
| 5,988,265 A | 11/1999 | Marthaler |
| 6,161,614 A | 12/2000 | Woodhull, Jr. |
| 6,182,749 B1 | 2/2001 | Brost |
| 6,253,837 B1 | 7/2001 | Seiler |
| 6,302,191 B1 | 10/2001 | Wickham |
| 6,401,670 B2 * | 6/2002 | Frunzetti ............... F01M 5/007 123/41.31 |
| 6,505,812 B1 | 1/2003 | Anastas |
| 6,533,242 B2 | 3/2003 | Geib |
| 6,659,050 B1 | 12/2003 | Creech |
| 6,772,958 B1 | 8/2004 | Lamb |
| 6,793,198 B2 | 9/2004 | Robison |
| 6,799,631 B2 | 10/2004 | Acre |
| 6,810,931 B2 | 11/2004 | Graffin |
| 6,886,597 B2 | 5/2005 | Dragoni |
| 7,178,553 B2 | 2/2007 | Peric |
| 7,487,826 B2 | 2/2009 | Pineo |
| 7,490,622 B2 | 2/2009 | Jones |
| 7,490,662 B2 | 2/2009 | Eliades |
| 7,617,700 B2 | 11/2009 | Lamb |
| 7,717,164 B2 | 5/2010 | Richter |
| 7,735,520 B2 | 6/2010 | Peric |
| 7,748,442 B2 | 7/2010 | Kalbacher |
| 7,854,256 B2 | 12/2010 | Pineo |
| 8,919,299 B2 | 12/2014 | Potter |
| 9,188,055 B2 | 11/2015 | Potter |
| 9,360,262 B2 | 6/2016 | Kim |
| 9,945,623 B2 * | 4/2018 | Sheppard ............... F28D 9/005 |
| 10,087,793 B2 | 10/2018 | Boyer et al. |
| 10,107,158 B2 | 10/2018 | Schmidgall |
| 2002/0005179 A1 | 1/2002 | Frunzetti |
| 2003/0019620 A1 | 1/2003 | Pineo |
| 2003/0062493 A1 | 4/2003 | Lin |
| 2003/0197142 A1 | 10/2003 | Tawns |
| 2005/0205236 A1 | 9/2005 | Kalbacher |
| 2007/0084809 A1 | 4/2007 | Bradu |
| 2008/0110605 A1 | 5/2008 | Richter |
| 2009/0025922 A1 | 1/2009 | Strzelczyk |
| 2011/0042060 A1 | 2/2011 | Pineo |
| 2013/0042927 A1 * | 2/2013 | Neelakantan ....... F16H 57/0413 137/334 |
| 2016/0146554 A1 * | 5/2016 | Bhatia ................ F16K 31/002 165/100 |
| 2018/0172328 A1 * | 6/2018 | Feldkeller ............... F25B 39/02 |
| 2018/0274406 A1 | 9/2018 | Dries et al. |
| 2018/0371968 A1 | 12/2018 | Boyer et al. |

FOREIGN PATENT DOCUMENTS

| | | |
|---|---|---|
| CN | 207334213 U | 5/2018 |
| EP | 1719959 A2 | 11/2006 |
| JP | 379637 B2 | 12/1991 |
| WO | 2016122970 A1 | 8/2016 |
| WO | 2018154471 A1 | 8/2018 |

OTHER PUBLICATIONS

ISA Handbook of Control Valves, 2nd Edition, pp. 14-15, Jun. 1, 1976.
Parker Fluid Connectors, Rising Stem Plug Valve, p. 13, Jul. 1994.
The People's Republic of China, Chinese Search Report with written opinion issued in Application 201380028926.5, 13 pages, The State Intellectual Property Office of The People's Republic of China, Shanghai, China.
Canadian Intellectual Property Office, International Search Report with written opinion issued in PCT/CA2013/050417, dated Jul. 24, 2013, 10 pages, Canadian Intellectual Property Office, Quebec, Canada.

* cited by examiner

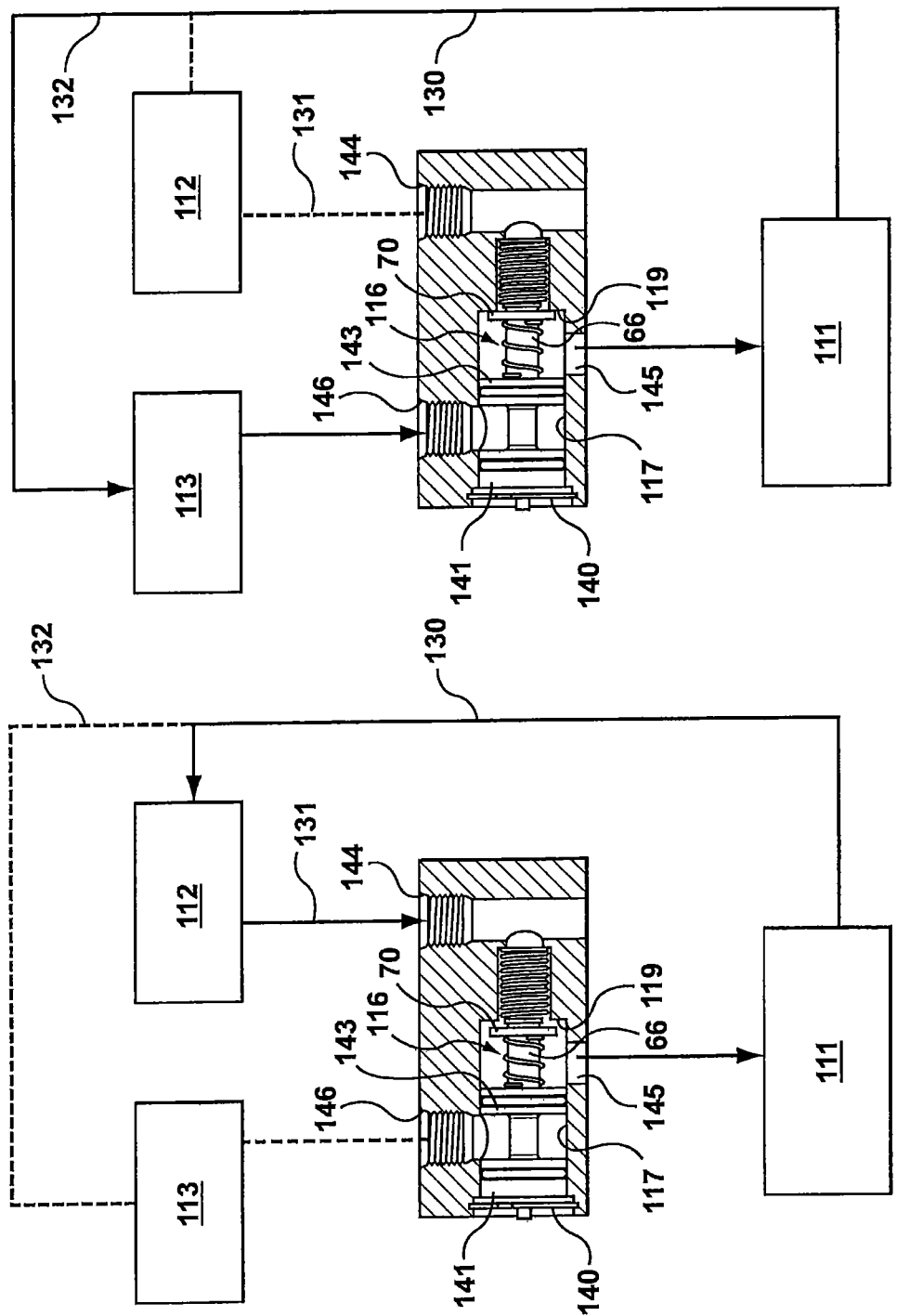

HEAT EXCHANGER ASSEMBLY WITH INTEGRATED VALVE WITH PRESSURE RELIEF FEATURE FOR HOT AND COLD FLUIDS

TECHNICAL FIELD

The invention relates to various heat exchanger assemblies wherein a valve mechanism, such as a control valve or thermal bypass valve, is integrated into the structure of a heat exchanger.

BACKGROUND

In the automobile industry, for example, control valves and/or thermal valves are often used in combination with heat exchangers to either direct a fluid to a heat exchanger unit to be cooled/heated, or to direct the fluid elsewhere in the fluid circuit within the automobile system so as to "bypass" the heat exchanger. Control valves or thermal valves are also used within automobile systems to sense the temperature of a particular fluid and direct it to an appropriate heat exchanger, for either warming or cooling, to ensure the fluids circuiting through the automobile systems are within desired temperature ranges.

Traditionally, control valves or thermal bypass valves have been incorporated into a heat exchange system by means of external fluid lines that are connected to an inlet/outlet of a heat exchanger, the control valves being separate to the heat exchanger and being connected either upstream or downstream from the heat exchanger within the external fluid lines. These types of fluid connections require various parts/components which increase the number of individual fluid connections in the overall heat exchange system. This not only adds to the overall costs associated with the system, but also gives rise to multiple potential points of failure and/or leakage. Size constraints are also a factor within the automobile industry with a trend towards more compact units or component structures.

Accordingly, there is a need for improved heat exchanger assemblies that can offer improved connections between the control valves and the associated heat exchanger, and that can also result in more compact, overall assemblies.

SUMMARY OF THE PRESENT DISCLOSURE

In accordance with an aspect of the present disclosure, there is provided a heat exchanger assembly comprising a heat exchanger and a valve integration unit.

The heat exchanger comprises a plurality of alternating first and second fluid flow passages in heat exchange relation; a first manifold and a second manifold interconnected by the plurality of first fluid flow passages; and a third manifold and a fourth manifold interconnected by the plurality of second fluid flow passages.

The valve integration unit is fixedly attached to the heat exchanger, and comprises a housing and a valve mechanism. The housing comprises first to sixth fluid ports, three of which are provided for input of a first fluid into the valve integration unit, and three of which are provided for output of the first fluid from the valve integration unit. The housing further comprises a first portion, a second portion and a third portion, the interior space defining a longitudinal axis of the housing; wherein the second portion of the interior space defines a valve chamber; and wherein the third portion of the interior space defines a bypass flow passage between the first and second portions of the interior space.

The first and second fluid ports provide fluid communication between the interior space of the housing and the first and second manifolds of the heat exchanger, wherein one of the first and second fluid ports is provided for input of the first fluid from the heat exchanger to the valve integration unit, and the other of the first and second fluid ports is provided for output of the first fluid from the valve integration unit to the heat exchanger.

The third and fourth fluid ports provide fluid communication between the interior space of the housing and a first remote vehicle component, wherein one of the third and fourth fluid ports is provided for input of the first fluid from the first remote vehicle component to the valve integration unit, and the other of the third and fourth fluid ports is provided for output of the first fluid from the valve integration unit to the first remote vehicle component.

The fifth and sixth fluid ports provide fluid communication between the interior space of the housing and a second remote vehicle component, wherein one of the fifth and sixth fluid ports is provided for input of the first fluid from the second remote vehicle component to the valve integration unit, and the other of the fifth and sixth fluid ports is provided for output of the first fluid from the valve integration unit to the second remote vehicle component.

The first, fourth and sixth fluid ports of the housing are in fluid communication with each other through the first portion of the interior space; and the second, third and fifth fluid ports of the housing are in fluid communication with each other through the second portion of the interior space.

The valve mechanism oriented along the longitudinal axis and comprises a temperature responsive actuator and first, second and third valve members.

The first valve member is movable along the longitudinal axis for opening and closing a first valve opening located in the second portion of the interior space, the first valve member and the first valve opening being located between the third fluid port and the fifth fluid port which are longitudinally spaced apart from one another, wherein the movement of the first valve member is actuated by the temperature responsive actuator.

The second valve member is movable along the longitudinal axis for opening and closing a second valve opening located in the second portion of the interior space, the second valve member and the second valve opening being located between the second fluid port and the fifth fluid port which are longitudinally spaced apart from one another, wherein the movement of the second valve member is actuated by the temperature responsive actuator.

The third valve member is movable along the longitudinal axis for opening a third valve opening, the third valve member and the third valve opening being located within the second portion of the interior space, and between the second interior portion and the third interior portion of the interior space. The third valve member is actuatable to open the third valve opening in response to a fluid pressure differential between the first and second portions of the interior space.

BRIEF DESCRIPTION OF THE DRAWINGS

Exemplary embodiments of the present disclosure will now be described, by way of example, with reference to the accompanying drawings, in which:

FIG. 6A is a schematic view of the heat exchanger assembly of FIG. 4 illustrating the cold flow condition of the integrated valve structure;

FIG. 6B is a schematic view of the heat exchanger assembly of FIG. 4 illustrating the hot flow condition of the integrated valve structure;

DETAILED DESCRIPTION OF EXEMPLARY EMBODIMENTS

Figure 1:
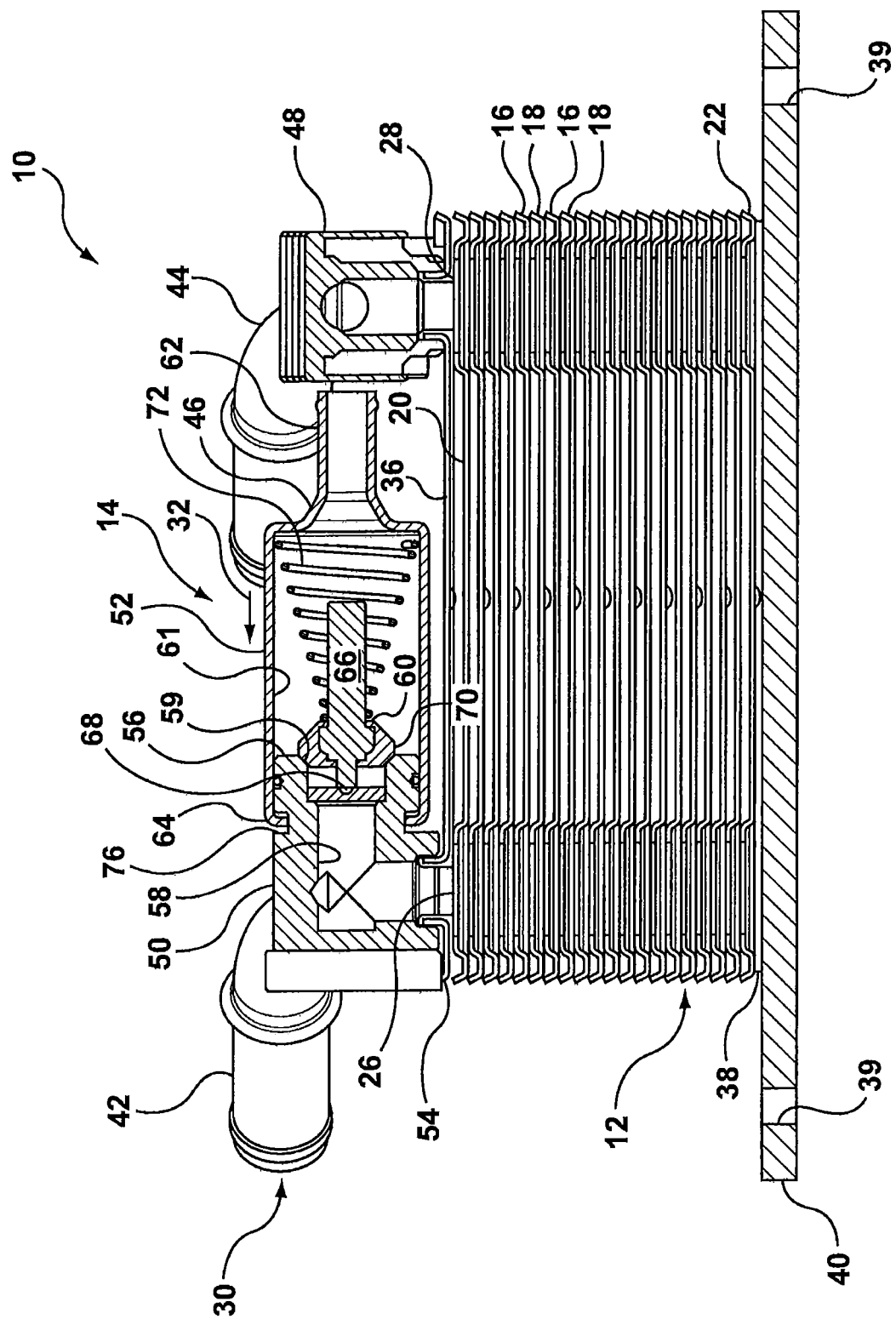
FIG. 1 is a schematic, sectional view of a heat exchanger assembly with an integrated valve structure.

Referring now to FIG. 1, there is shown an exemplary embodiment of a heat exchanger assembly 10 according to the present disclosure. Heat exchanger assembly 10 is comprised of a heat exchanger 12 with an integrated control valve or valve assembly 14. Heat exchanger 12 is generally in the form of a nested, dished-plate heat exchanger, as is known in the art, although various other forms of known plate-type heat exchangers can be used in combination with the valve assembly 14 as would be understood by persons skilled in the particular art.

Figure 2:
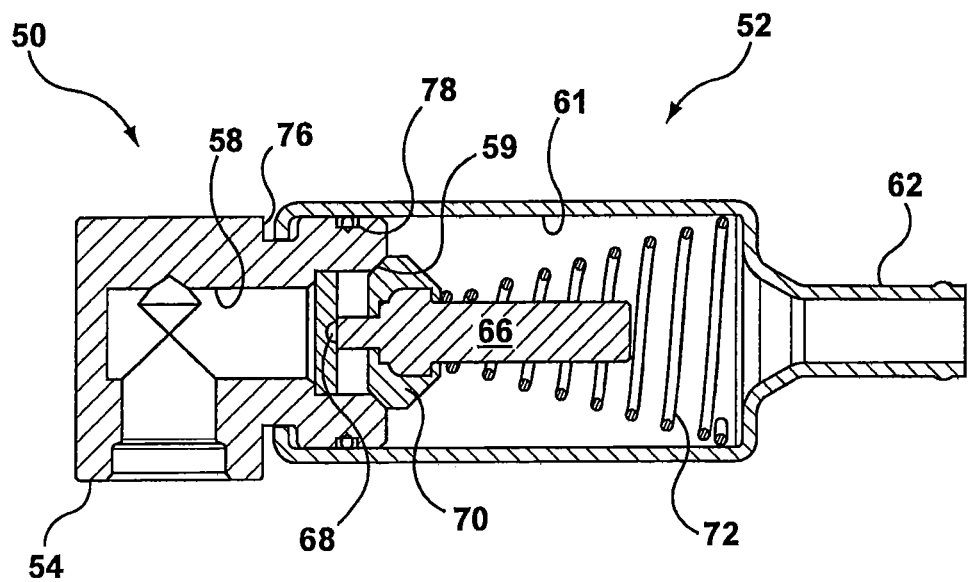
FIG. 2 is a detail, cross-sectional view of the valve structure of FIG. 1.
Figure 3:
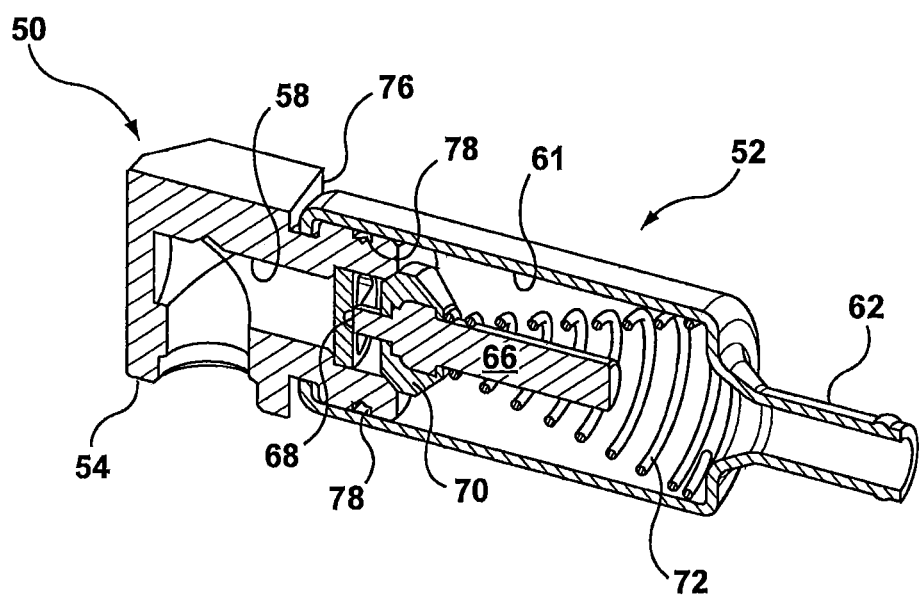
FIG. 3 is a perspective, cross-sectional view of the valve structure as shown in FIG. 2.
Figure 4:
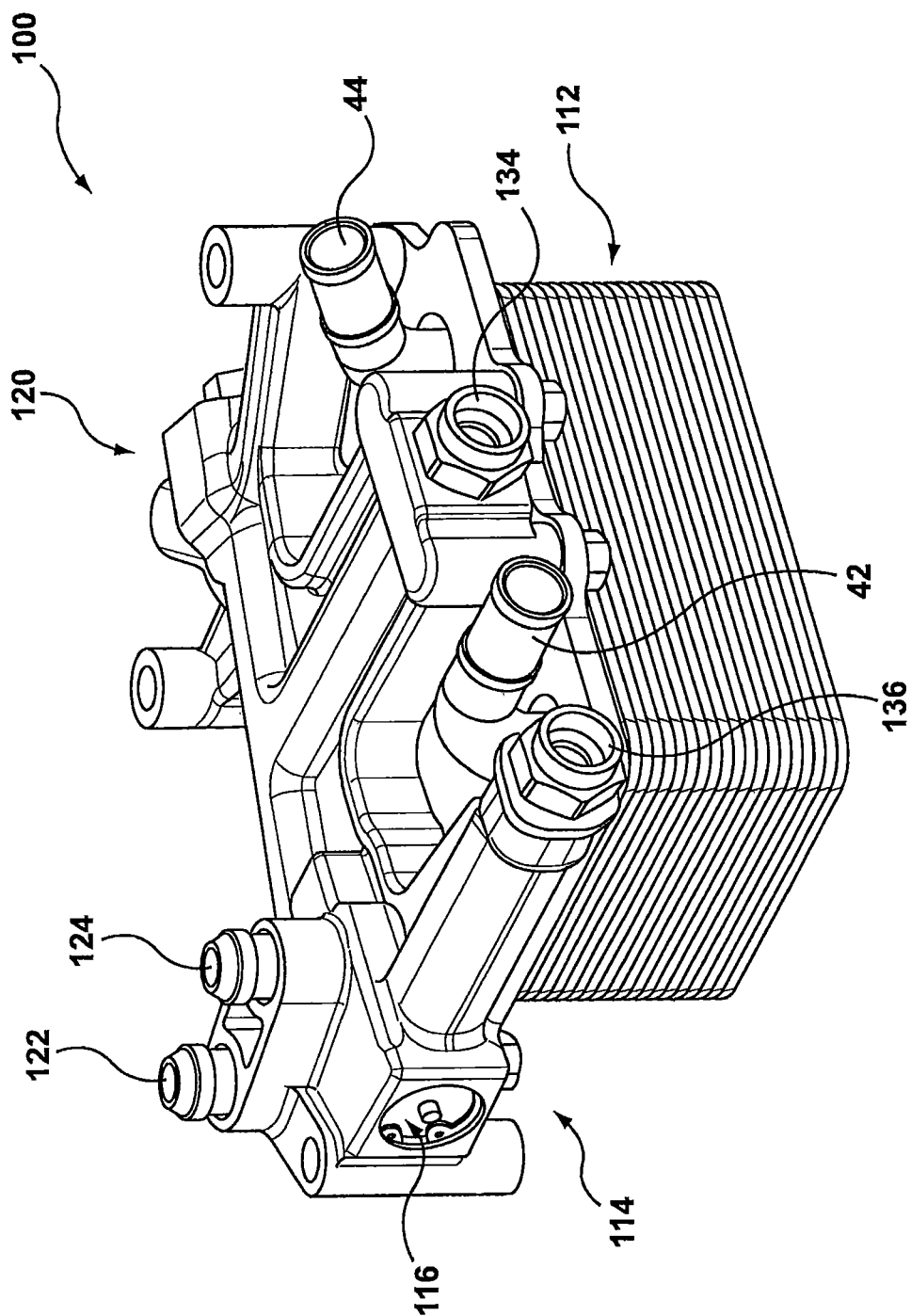
FIG. 4 is a perspective view of a heat exchanger assembly with an integrated valve structure according to another example embodiment of the present disclosure.
Figure 5:
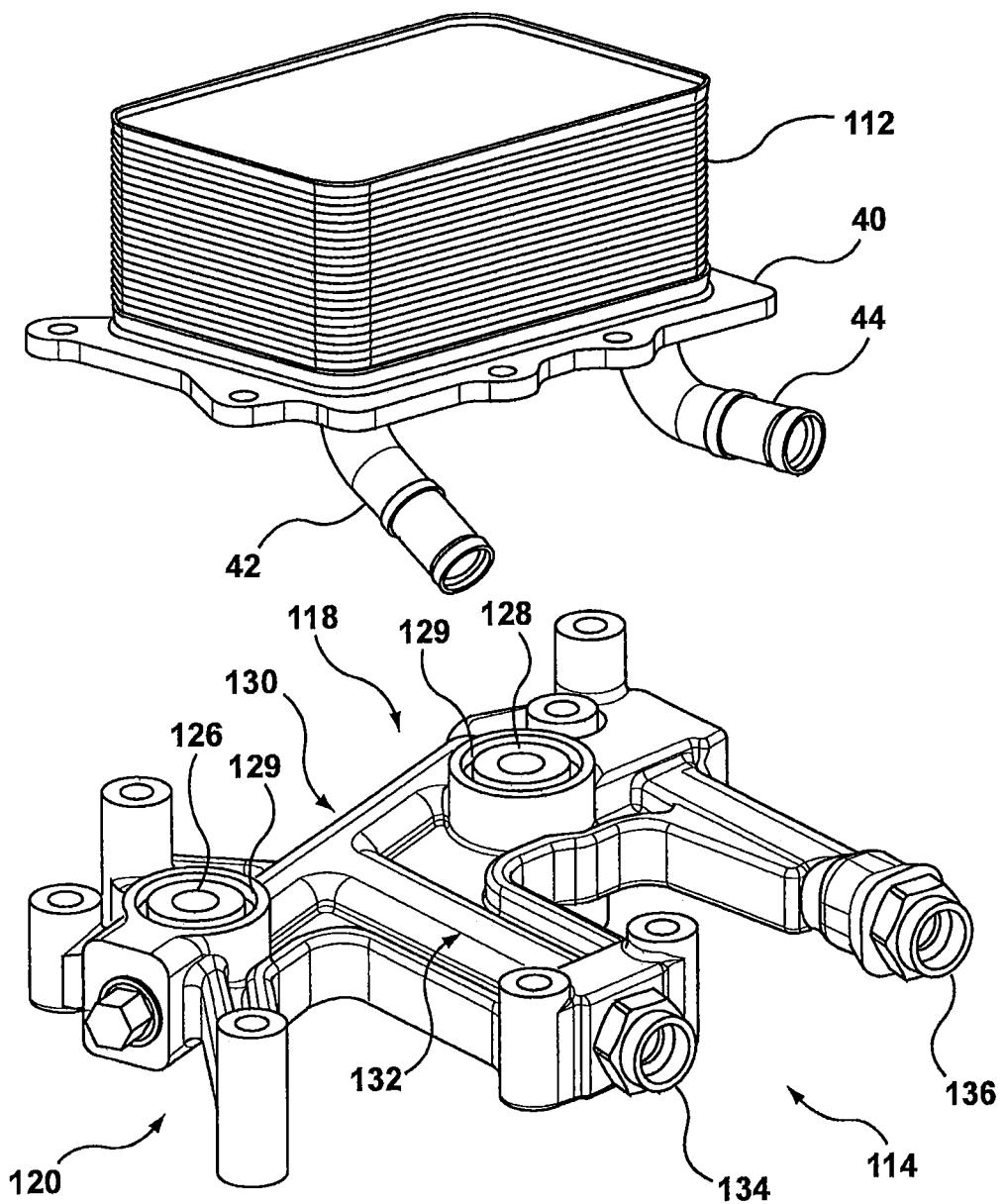
FIG. 5 is an assembly view of the heat exchanger assembly of FIG. 4, with the assembly having been rotated 180 deg.
Figure 7A:
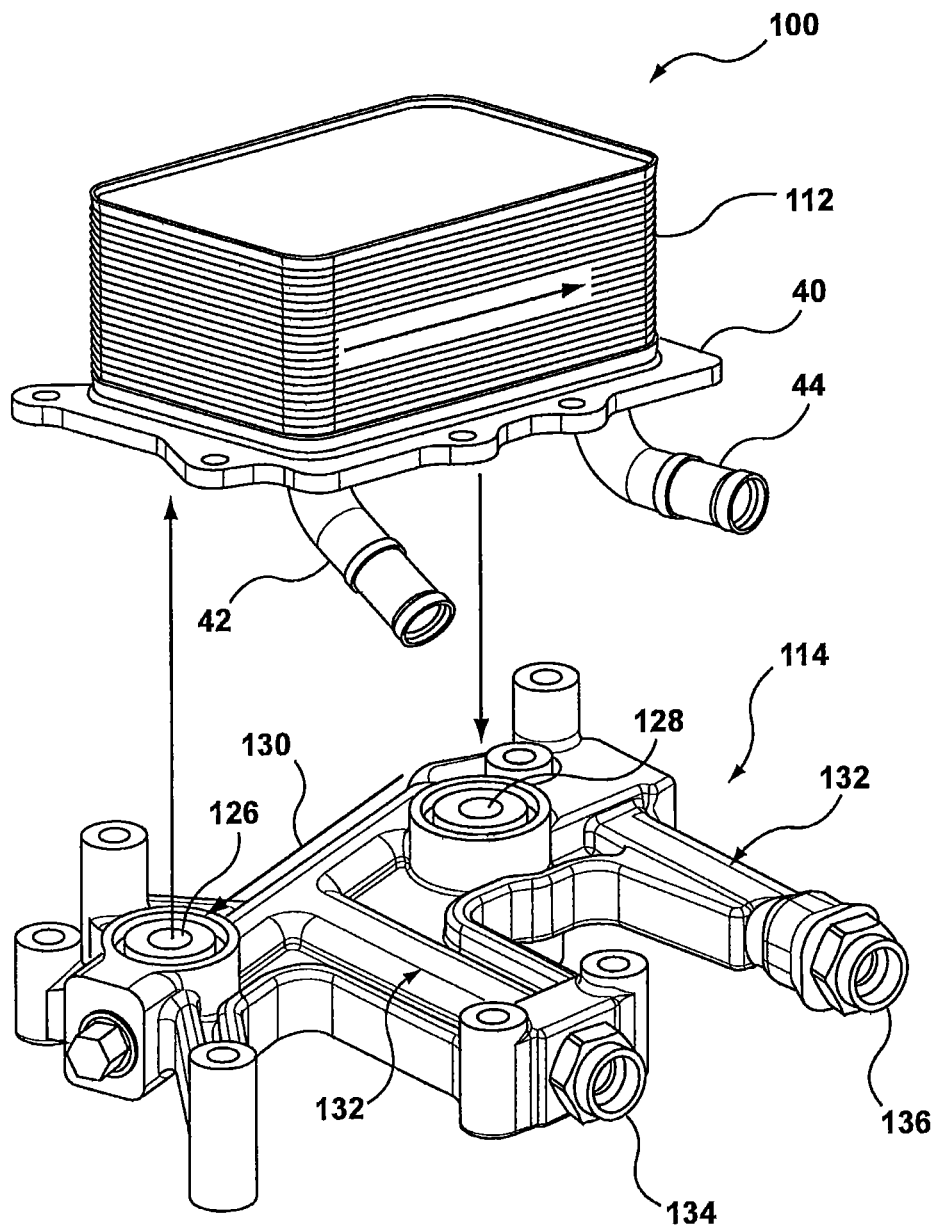
FIG. 7A is an assembly view as shown in FIG. 5 illustrating the "cold" condition flow path through the heat exchanger assembly.
Figure 7B:
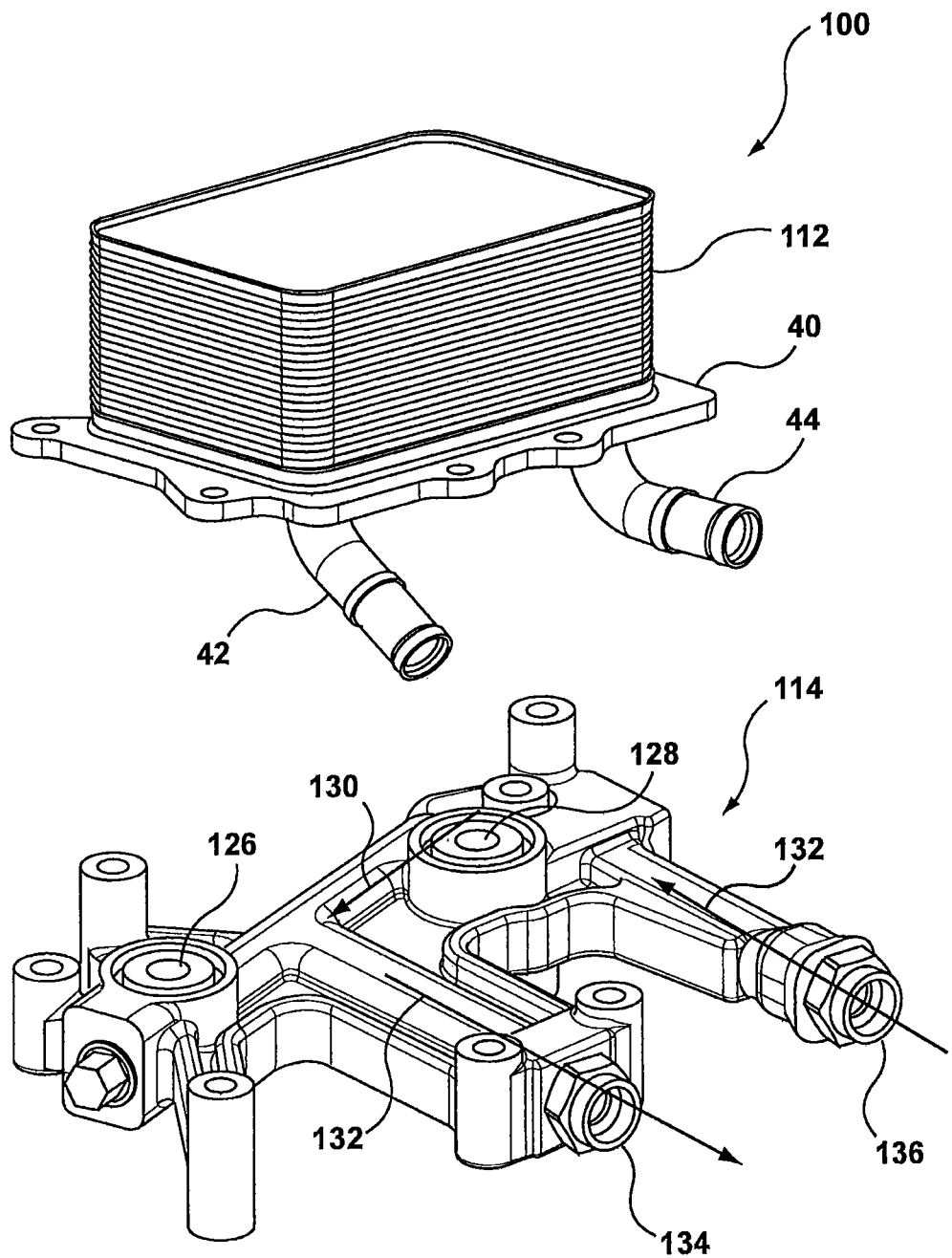
FIG. 7B is an assembly view as shown in FIG. 5 illustrating the "hot" condition flow path through the heat exchanger assembly.
Figure 8:
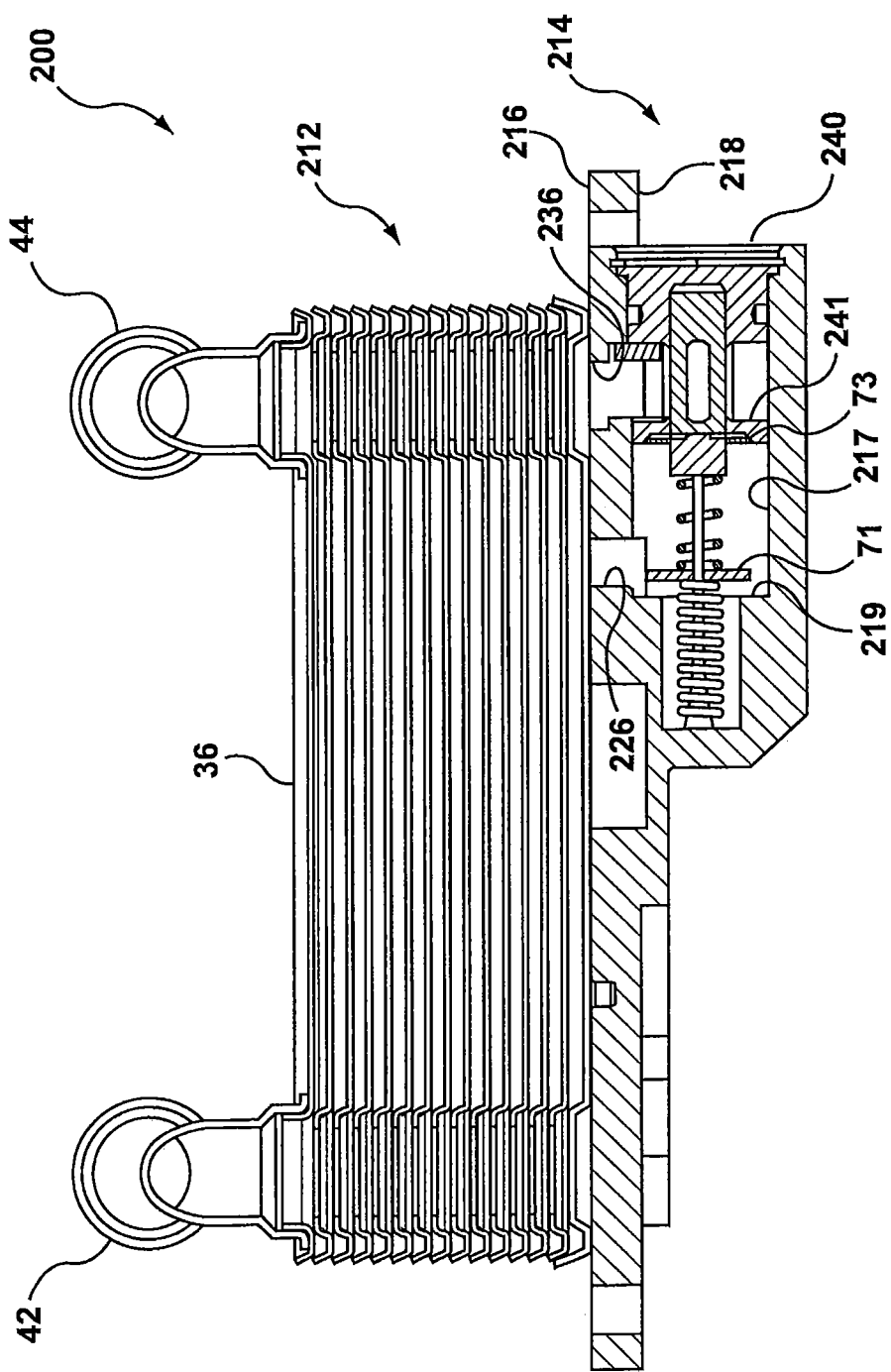
FIG. 8 is a sectional view of a heat exchanger assembly with an integrated valve structure according to another example embodiment of the present disclosure.
Figure 9:
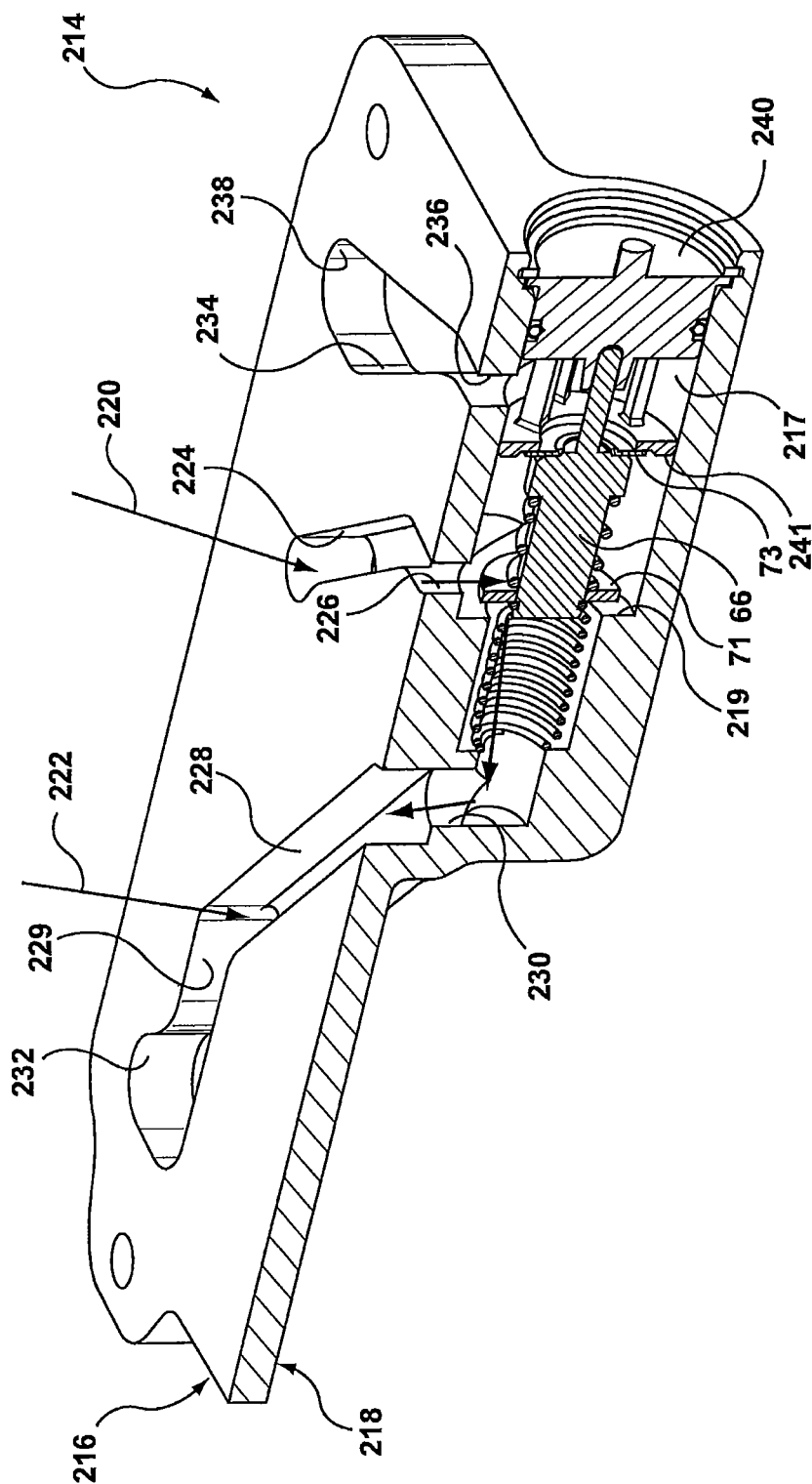
FIG. 9 is a perspective, cross-sectional view of a base plate for the heat exchanger assembly of FIG. 8 illustrating a first operational position of the integrated valve structure.
Figure 10:
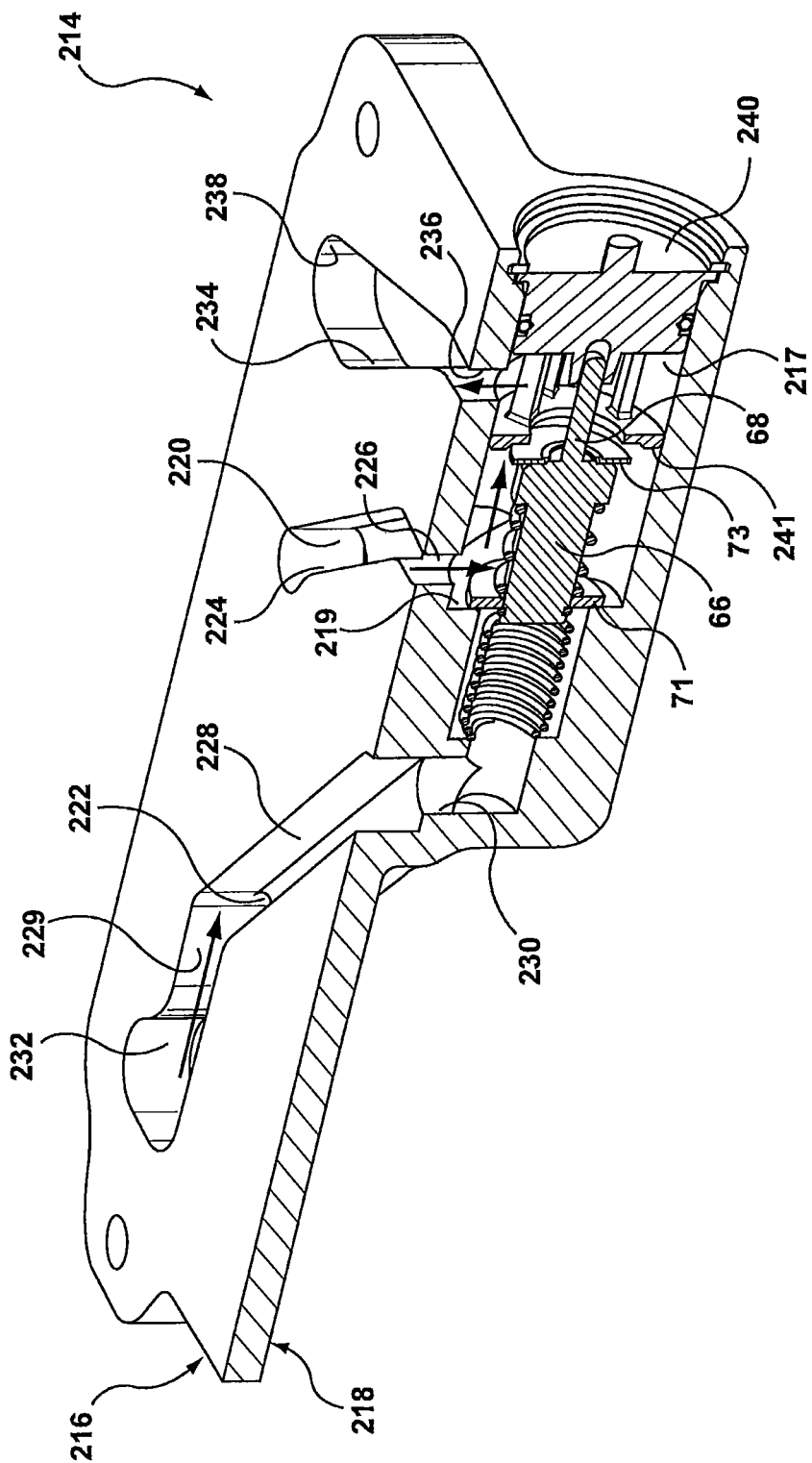
FIG. 10 is a perspective, cross-sectional view of the base plate assembly of FIG. 8 illustrating a second operational position of the integrated valve structure.
Figure 11:
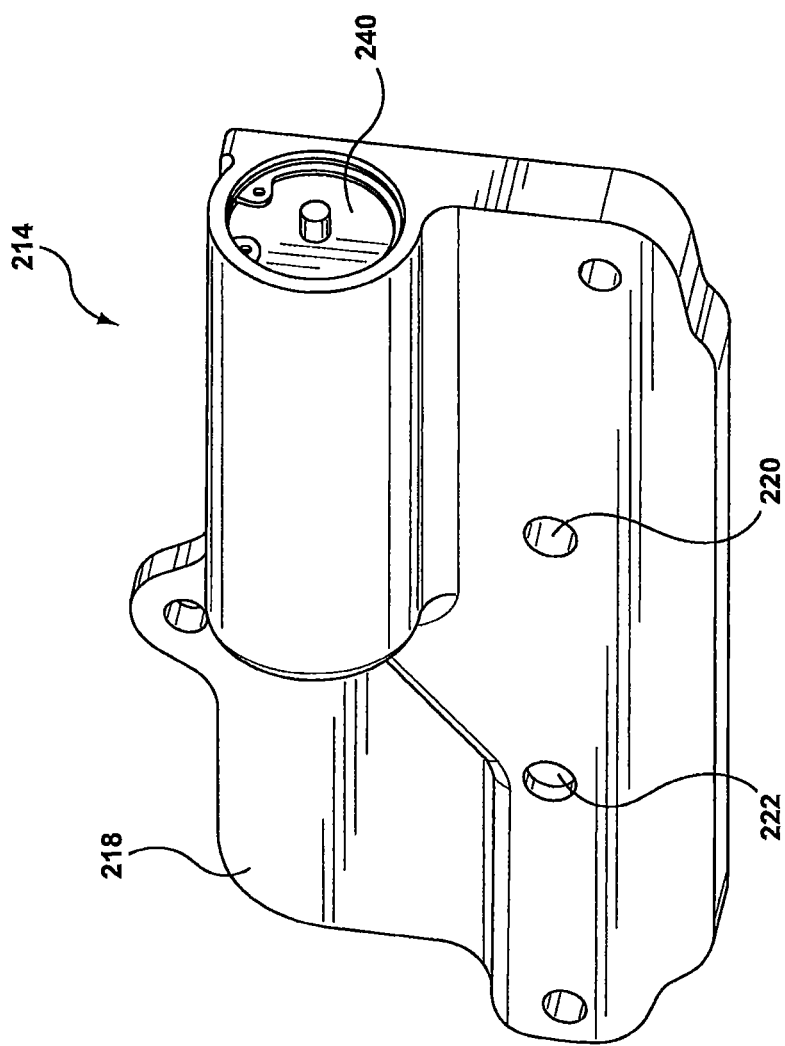
FIG. 11 is perspective, bottom view of the base plate of FIGS. 9 and 10.
Figure 12:
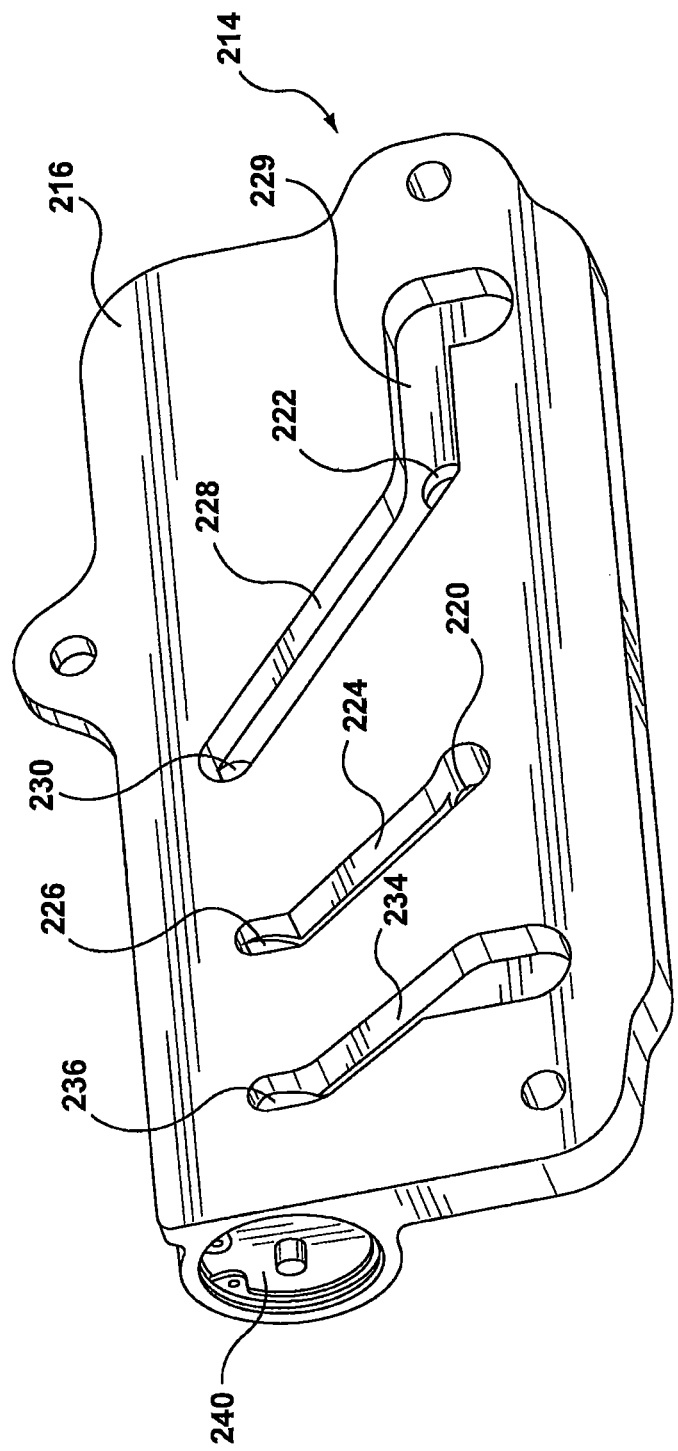
FIG. 12 is a perspective top view of the base plate of FIGS. 8 and 9.

In the specific embodiment shown in FIGS. 1-3, heat exchanger 12 is comprised of a plurality of stamped heat exchanger plates 16, 18 disposed in alternatingly, stacked, brazed relation to one another forming alternating first and second fluid flow passages therebetween. The heat exchange plates 16, 18 each comprise a generally planar base portion 20 surrounded on all sides by sloping edge walls 22. The heat exchange plates 16, 18 are stacked one on top of another with their edge walls in nested, sealed engagement. Each heat exchange plate 16, 18 is provided with four fluid openings (not shown) near its four corners, each of which serves as an inlet/outlet for a heat exchange fluid to enter/ exit one of the first or second fluid flow passages formed between the plates 16, 18. Two of the four fluid openings are raised with respect to the base portion of the plate while the other two fluid openings are formed in and are co-planar with the base portion of the plate 16, 18. The raised openings in one plate 16 align with and seal against the flat or co-planar openings of the adjacent plate 18 thereby spacing apart the adjacent plates 16, 18 and defining the alternating first and second fluid passages therebetween.

The aligned fluid openings in the stacked plates 16, 18 form a pair of first manifolds 26, 28 (i.e. and inlet manifold and an outlet manifold) coupled together by the first fluid flow passages for the flow of a first heat exchange fluid through the heat exchanger 12 and form a pair of second manifolds (i.e. and inlet manifold and an outlet manifold) coupled together by the second fluid flow passages for the flow of a second heat exchange fluid through the heat exchanger 12. For example, depending upon the particular application, one of the first or second heat exchange fluids can be oil (i.e. engine oil or transmission oil) while the other heat exchange fluid can be a standard, known liquid for cooling/heating oil.

End plates 36, 38 enclose the stack of heat exchange plates 16, 18. Depending upon the particular application, the end plates 36, 38 are designed with a particular number of fluid openings, each in fluid communication with either the first manifolds 26, 28 or the second manifolds, for the inlet/outlet of the first and second heat exchange fluids into/out of the heat exchanger 12. In the example shown, the top end plate 36 is provided with four fluid openings while the bottom end plate 38 has no fluid openings. It will be understood, however, that various other configurations (for example, two fluid openings on the top of the heat exchanger and two fluid openings on the bottom, three fluid openings on top bottom and one on the bottom, or vice versa, or all fluid openings provided on the bottom) are also contemplated and included within the scope of the present disclosure.

In the illustrated embodiment, a base plate 40 is provided at the base of the heat exchanger core and is brazed to bottom end plate 38. The base plate is substantially thicker than heat exchanger plates 16, 18 and is provided with various mounting holes 39 to allow for the heat exchanger assembly 10 to be mounted within the heat exchanger system. Depending upon the particular application of the heat exchanger assembly, a base plate 40 may or may not be included and its illustration in FIG. 1 should not be considered to be limiting.

Heat exchangers of the type described above are generally known in the art and, for instance, described in U.S. Pat. No. 7,717,164, the teachings of which are incorporated herein by reference. Furthermore, the above-described heat exchanger 12 has been described for illustrative purposes and it will be understood that any suitable heat exchanger, as known in the art, may be used in the various heat exchanger assemblies described in the present disclosure.

The various fluid connections provided on the top end plate 36 of the heat exchanger 12 will now be described in further detail in reference to the exemplary embodiment shown in FIGS. 1-3.

As shown in FIG. 1, the heat exchanger 12 is provided with four separate fluid connections 42, 44, 46, 48 on its top end plate 36. Each fluid connection is fixedly attached and fluidly coupled to one of the fluid openings provided in end plate 36. Fluid connections 42, 44 each serve as a respective inlet, outlet for one of the first and second heat exchange fluids flowing through the heat exchanger 12. For example, fluid connection 42 may be an inlet for directing a suitable heat exchange fluid for cooling (or warming) into the heat exchanger and fluid connection 44 may be the outlet for directing the suitable heat exchanger fluid (i.e. a coolant) out of the heat exchanger 12 and elsewhere in the heat exchange system. It will be understood however that the specific fluid connections 42, 44 illustrated and described are intended to be exemplary and not limited thereto, as would be understood by persons skilled in the art.

Fluid connections 46, 48 also serve as respective inlet, outlet for the other of the first and second heat exchange fluids flowing through the heat exchanger. In the example described above, if the fluid flowing through connections 42, 44 is a suitable heat exchange fluid for cooling (or warming), then the fluid flowing through connections 46, 48 is a heat exchanger fluid requiring cooling (or warming) such as transmission oil or engine oil. In the subject embodiment, fluid connection 48 is the outlet connection and directs the cooled/heated heat exchange fluid (i.e. transmission oil) from the heat exchanger back into the heat exchange system (i.e. back to the transmission or engine) and is in the form of a known or standard fluid fitting connection.

While the outlet fluid connection 48 is in the form of a known or standard fluid fitting or connection, the inlet fluid connection 46, however, is in the form of an integrated valve structure which either allows the fluid (i.e. the oil) to enter the heat exchanger 12 to be cooled/heated or directs the fluid elsewhere in the heat exchange system so as to "bypass" the heat exchanger 12, as will be discussed in further detail below.

Fluid connection 46 is in the form of a valve assembly 14 fixedly attached to the upper or top end plate 36 of the heat exchanger 12. In some embodiments the valve assembly 14 is brazed directly to the heat exchanger 12 in fluid communication with one of the fluid openings in the top end plate 36. In other embodiments the valve assembly may be bolted to the heat exchanger 12 or secured to the heat exchanger 12 using any suitable means. The valve assembly 14 is comprised of a first part 50 and a second part 52 that are mechanically coupled together. The first part 50 has a first end 54 for brazing (or direct mounting) to the exterior of the heat exchanger 12 and a second end 56 for connecting to second part 52 of the valve assembly 14. A fluid passage 58 interconnects the first end 54 and the second end 56, the fluid passage 58 being aligned with and in fluid communication with the inlet manifold 26 of one of the pairs of manifolds of the heat exchanger 12 (i.e. the first pair of manifolds 26, 28). The second end 56 of the first part 50 is provided with a valve seat 59 for receiving and sealing with a corresponding valve member 60.

The second part 52 of the valve assembly 14 comprises a valve chamber 61 and has a first end 62 for coupling to a fluid line or external fluid conduit provided within the overall heat exchange system, and a second end 64 for receiving and sealingly connecting with the corresponding second end 56 of the first part 50 of the housing. In the specific embodiment illustrated, the first part 50 and second part 52 of the housing are joined together by a mechanical crimping process after the first part 50 is brazed or otherwise fixedly attached to the heat exchanger 12, although other means for mechanically joining the two parts 50, 52 of the valve assembly 14 are also contemplated herein. For instance, the first and second parts 50, 52 can be formed with corresponding threaded second ends 56, 64. Alternatively, they could be secured together with clips or may be formed as corresponding ends of a twist-lock, for example.

The valve chamber 61 is appropriately sized to receive a valve mechanism which includes a thermal actuator or temperature responsive actuator (i.e. a wax motor or electronic, solenoid valve) 66, as is known in the art. In the illustrated embodiment, the thermal actuator 66 includes an actuator piston 68 moveable from a first position to a second position by means of expansion/contraction of the wax (or other suitable material) contained in the thermal actuator 66 which expands/contracts in response to the temperature of the fluid entering the valve chamber 61, although it will be understood that the actuator piston may also be controlled by a solenoid coil, for example, or any other suitable means. A valve disk or sealing disk 70 is operably coupled to the thermal actuator 66 (i.e. coupled to one end of the actuator piston 68). The valve disk 70 sits within or seals against the corresponding valve seat 59 provided in the second end 56 of the first part 50 of the valve assembly 14 when the thermal actuator 66 is in its first or closed position (i.e. cold condition), with the valve disk 70 being moved away from the valve seat 59 through expansion of the wax material thereby opening fluid communication between the valve chamber 61 in the second part 52 of the valve housing and the fluid passage within the first part 50 of the valve housing.

When the valve mechanism is in the "closed" position with the valve disk 70 sealed against valve seat 59, while some fluid entering the valve assembly 14 may still seep past valve disk 70 and enter the heat exchanger 12, the majority of the fluid (i.e. the transmission oil) bypasses the heat exchanger through an outlet port provided upstream of first end 62 of the second part 52 (such as a T-type junction or fitting) or by means of an outlet port (not shown) provided in second part 52 in communication with valve chamber 61 for allowing fluid to bypass the heat exchanger 12.

In certain embodiments, the valve chamber 61 in the second part 52 of the valve housing contains a biasing means 72 that biases the valve disk 70 in its first or closed position against the valve seat. In the illustrated embodiment, the biasing means 72 is in the form of a spring, although the biasing means is not intended to be limited to a spring and any suitable means for biasing the valve disk 70 may be used.

The first part 50 of the valve housing is typically made of aluminium (i.e. 6061 aluminum alloy) or any other suitable material so that the first part 50 can be positioned on the heat exchanger 12 and the entire heat exchanger assembly can be brazed together in a brazing furnace. Since the first part 50 of the valve housing does not contain any of the valve or thermal actuator components), this component of the valve assembly 14 can be brazed directly to the heat exchanger 12. Once the assembly has cooled, the second part 52 of the valve housing, which houses the thermal valve components/mechanism, is mechanically fixed to the first part 50. Since only the first part 50 of the valve assembly is adapted to be brazed directly to the heat exchanger, the second part 52 of the valve assembly can be made of any suitable metallic or non-metallic material (such as aluminum, plastic or other non-metallic material) and can, therefore, be rather lightweight.

As mentioned above, in a preferred embodiment, the second part 52 of the housing is crimped over the second end 56 of the first part 52 of the housing. To facilitate this connection, the second end 56 of the first part 52 is provided with a circumferentially extending groove or notch 76 for receiving the crimped, open end of the second part 52 of the valve assembly 14. To further enhance the seal between the first and second parts 50, 52 of the valve assembly 14, the second end 56 can also be provided with a circumferentially-extending sealing groove 78 in the outer surface thereof for receiving a seal means, such as an O-ring, for providing an additional seal between the outer surface of the second end 56 of the first part 50 and the inner surface of the valve chamber 61 of the second part 52.

In operation, the valve assembly 14 remains in its "closed" position with the sealing disk 70 seated within or sealed against valve seat 59 until the temperature of the fluid (i.e. transmission oil) being sensed in valve chamber 61 reaches a predetermined temperature. As a result of the increase in temperature, the thermal actuator 66 is activated by means of expansion of the thermal material (or activation of a solenoid, for example) which causes the valve disk 70 to move away from valve seat 59 thereby creating a fluid connection between valve chamber 61 and fluid channel 58. The fluid entering valve assembly 58 is then directed through heat exchanger 12 for cooling before being directed out of the heat exchanger 12 through outlet 48 and back to into the overall heat exchange circuit, for example back to the transmission. By having a portion (i.e. first part 50) of the valve assembly 14 brazed or mounted directly to the heat exchanger core which functions as the fluid inlet (or outlet) fitting to the heat exchanger, at least one set of fluid connections is eliminated thereby reducing the total potential points of leakage in the overall heat exchanger system.

While the above-described example embodiment has been described with reference to a thermal actuator 66 in the form of a "wax motor", it will be understood that the subject embodiment is not limited thereto and that any suitable thermal actuator for actuating a valve mechanism may be used. For instance, an electronic valve mechanism can also be used wherein the thermal actuator 66 is in the form of a temperature responsive actuator including a solenoid having a solenoid coil and central actuator shaft coupled to the valve disk 70. Therefore, it will be understood that wax motors, electronic valve mechanisms or any suitable valve mechanism known in the art may be used in conjunction with the described heat exchanger assembly based on the particular application of the heat exchanger assembly 10 and the desired function of the valve.

As well, while the above-described example embodiment has been described with reference to the valve assembly 14 being fixedly attached or mounted directly to the top end plate 36 of the heat exchanger 12, it will be understood that the valve assembly 14 could be attached or mounted to the bottom end of the heat exchanger 12 through corresponding openings provided in the base plate 40 and bottom end plate 38 of the heat exchanger 12, depending upon the particular application and desired location of the fluid connections.

Another example embodiment of a heat exchanger assembly with an integrated valve structure or valve integration unit according to the present disclosure will now be described with specific reference being made to FIGS. 4-7.

In the subject embodiment, the heat exchanger assembly 100 is comprised of a heat exchanger 112 and a valve integration unit in the form of a manifold structure 114 with integrated valve assembly 116. The heat exchanger 112 is generally in the same form as the heat exchanger 12 described above (and therefore will not be described in further detail with regard to this example embodiment) with the obvious difference that, in the specific example embodiment shown, all of the fluid connections for directing the first and second heat exchanger fluids into and out of the heat exchanger 112 are provided at the bottom end of the heat exchanger 112 rather than the top end of the heat exchanger 112. However, it will be understood, that the heat exchanger assembly 100 is not necessarily limited to this particular heat exchanger 112 arrangement. For instance, fluid connections 42, 44 could be provided at the top of the heat exchanger 112 with the manifold structure 114 being positioned at the bottom end of the heat exchanger 112, or vice versa.

The manifold structure 114 is an extruded or cast structure that is formed with an internal valve cavity 117 (shown schematically in FIGS. 6A and 6B) adapted to receive valve assembly 116, such as a control valve or thermal valve, for directing a first fluid (i.e. transmission oil) either through heat exchanger 112 to be warmed and returned back to the transmission 111, or away from heat exchanger 112 to another heat exchange component (such as a cooler) 113 elsewhere in the overall heat exchange system and then returned back to the transmission 111 through the manifold structure 114. Accordingly, the manifold structure 114 is also formed with various internal fluid passages and corresponding fluid inlet/outlet ports for circuiting the heat exchange fluid or first fluid through the heat exchanger assembly as will be described in further detail below.

For the purpose of illustration, the operation of the heat exchanger assembly 100 will be described in the context of a thermal management unit which, depending upon the temperature of the oil entering the transmission 111, will either direct the transmission oil to a warmer, i.e. heat exchanger 112 to be heated or to a cooler, i.e. heat exchanger 113, to be cooled to ensure that the temperature of the transmission oil is within a desired range. Therefore, for the purpose of illustration, the first heat exchange fluid entering the manifold structure 114 and being directed to either heat exchanger 112 or elsewhere (i.e. heat exchanger 113, for example) in the heat exchange system is oil, while the heat exchanger 112 is also adapted to receive a second fluid (i.e. through fluid connections 42, 44) which may be any known heat exchange fluid suitable for warming the oil. It will be understood, however, that the heat exchanger 112 is not limited to a warmer for transmission oil and that various other heat exchangers may be used depending on the particular application and desired function of the heat exchanger assembly.

The manifold structure 114 has a first side 118 that is adapted to be in face-to-face contact and mounted to the base plate 40 of the heat exchanger 112, and a second side 120 opposite to the first side 118 that faces away from heat exchanger 112. The second side 120 of the manifold structure 114 (see FIG. 4) is provided with two fluid ports 122, 124. Fluid port 122 serves as an inlet port for receiving oil from the transmission 111 while fluid port 124 serves as an oil outlet from the manifold structure 114 for returning the oil to the transmission 111. The first side 118 of the manifold structure 214 is also provided with a pair of fluid ports 126, 128 (see FIG. 5). When the manifold structure 114 is mounted to heat exchanger 112, fluid port 126 is aligned with and in fluid communication with the first fluid inlet manifold of heat exchanger 112 while fluid port 128 is aligned with and in fluid communication with the first fluid outlet manifold. Fluid ports 126, 128 are both structured with sealing grooves 129 formed around the port openings for receiving an appropriate sealing means as is known in the art, for example an O-ring. The manifold structure 114 is further provided with a pair of fluid ports 134, 136. Fluid port 134 serves as an outlet port for the manifold structure 114 for directing the oil (or first heat exchanger fluid) out of the manifold structure 114 to another heat exchanger component elsewhere in the overall heat exchanger system. Fluid port 136 serves as an inlet port to the manifold structure 114 for receiving the oil (or first heat exchange fluid) from the other heat exchanger component and returning it to the transmission 111 through the manifold structure 114.

A first internal fluid channel 130 is formed within manifold structure 114 and is in fluid communication with the fluid inlet port 122 for receiving the first fluid or transmission oil from the transmission 111. Internal fluid channel 130 is also in fluid communication with fluid port 126 which directs the oil (or first heat exchange fluid) entering the manifold structure 114 to heat exchanger 112 thereby bringing the first fluid into heat exchange relationship with the second fluid flowing through heat exchanger 112. The first heat exchange fluid flows through the heat exchanger 112 and is returned to the manifold structure 112 through fluid port 128 to the internal valve cavity 117.

A second internal fluid channel 132 branches away from the first internal fluid channel 130 and directs the oil (or first heat exchange fluid) from inlet port 122 through the manifold structure 114 and out of the manifold structure 114 through outlet port 134 to another heat exchange component elsewhere in the overall heat exchange system. Fluid flowing through the second internal fluid channel 132 does not enter heat exchanger 112 and is, instead, directed to another heat exchanger or heat exchange component located elsewhere in the overall heat exchanger system. The first heat exchange fluid is then returned to the manifold structure through inlet port 136. A third internal fluid channel 135 is formed within the manifold structure 114 which interconnects inlet port 136 and internal valve cavity 117.

The valve assembly 116 will now be described in further detail in reference to FIGS. 6A and 6B. As mentioned above, valve assembly 116 is housed within internal valve cavity 117, the internal cavity 117 and valve assembly 116 being sealed by means of a valve cap 140. The internal valve cavity 117 serves as a valve chamber for receiving the components of the valve mechanism which includes a thermal or temperature responsive actuator (i.e. a wax motor or an electronic solenoid valve) 66, as is known in the art. The thermal actuator 66 includes an actuator piston moveable from a first position to a second position by means of expansion/contraction of the wax (or other suitable material) contained in the thermal actuator 66 which expands/contracts in response to the temperature of the fluid entering the internal valve cavity 117 (i.e. the temperature of the oil being returned to the transmission 111). The actuator piston 68 may also be controlled by activation of a solenoid coil when an electronic valve mechanism or solenoid valve is used. A valve disk or sealing disk 70 is operably coupled to the thermal actuator 66 (i.e. coupled to one end of the actuator piston 68) and sits within or seals against a corresponding valve seat 119 formed in the valve cavity 117 when the valve mechanism is in its "closed" position (or second valve position) illustrated schematically in FIG. 6B by the directional flow arrows, the valve disk 70 being moved away from the valve seat 119 when the valve mechanism is in the "open" position (or first valve position) illustrated schematically in FIG. 6A by the directional flow arrows. The thermal actuator 66 may also be provided with one or more biasing means (i.e. a spring) to ensure the valve disk 70 returns to its "normal" open position (shown in FIG. 6A).

The internal valve cavity 117 has a first inlet port 144 for receiving the first fluid exiting heat exchanger 112 through port 128 and a second inlet port 146 for receiving the first heat exchange fluid that has been returned to the manifold structure 114 after bypassing heat exchanger 112. The internal valve cavity 117 is also provided with an outlet port 145 in fluid communication with the manifold structure 114 outlet port 124 for returning the first heat exchange fluid, i.e. the oil to the transmission 111.

The valve cap 140, as shown in FIGS. 6A-6B, has a first enlarged end 141 which is solid and seals the valve cavity 117 and a second enlarged end 143 which seats one end of the thermal actuator 66. The second enlarged end 143 is provided with openings therethrough to allow fluid entering the valve cavity 117 through inlet port 146 to pass through the valve cap second end 143 to outlet port 145. In some embodiments a second valve disk (not shown) is also coupled to the thermal actuator 66 opposite to valve disk 70 for sealing against the second end 143 of the valve cap 140 when the valve is in the "open" or first valve position. The valve cap may be provided with seal members (i.e. O-rings) to enhance the seal between the valve cap 140 and the internal valve cavity 117. While a particular valve cap and valve mechanism have been described, it will be understood that any suitable valve mechanism and valve cap can be used as is known and understood in the art.

In operation, the first heat exchange fluid or oil leaves the transmission 111 and enters manifold structure 114 through inlet port 122. Initially, for instance during automobile start-up conditions, the fluid is directed to inlet port 122 through the first and second internal fluid channels 130, 132. Accordingly, a portion of the first heat exchange fluid (or transmission oil) initially entering the manifold structure 114 is directed to heat exchanger 112 while a portion is directed through the manifold structure 114 to another heat exchanger 113, for instance an oil-to-air (OTA) cooler downstream from manifold structure 114 outlet port 134. The first heat exchange fluid (or transmission oil) returned to the manifold structure 114 from either heat exchanger 112 or the other heat exchanger 113 external to heat exchanger assembly 100 enters the internal valve cavity 117 where the temperature of the fluid is "sensed" by the thermal actuator 66 that forms part of the valve assembly 116 before being returned to the transmission 111 via outlet port 124.

If the fluid being returned to the manifold structure 114 and entering the internal valve cavity 117 is "cold" (or within a certain temperature range), the valve assembly 116 will remain in its "normal", open position thereby directing the fluid entering the manifold structure 114 to heat exchanger 112 (for instance and oil-to-water (OTW) heat exchanger) for warming. As the temperature of the fluid entering the internal valve cavity 117 increases, in the illustrated embodiment the thermal actuator 66 is activated by means of expansion of the wax or other expandable material contained therein (or any other suitable activation means) thereby causing the valve disk 70 to move towards valve seat 119 until the valve mechanism reaches its "closed" position wherein the valve disk 70 seals against valve seat 119. With the valve mechanism in its "closed" position, fluid entering the manifold structure 114 through inlet port 122 will be directed through the second internal channel 132 towards outlet port 134 where it will be directed elsewhere in the overall heat exchanger system (i.e. to the OTA or other heat exchanger 113) for cooling. Due to the increased flow resistance through heat exchanger 112 resulting from the valve mechanism being in the "closed" position most, if not all, of the fluid entering the manifold structure 112 will be directed out of the manifold structure 114 to be cooled. Once the temperature of the fluid entering the internal valve cavity 117 through the manifold structure 114 inlet port 136 has been sufficiently cooled and reaches a predetermined temperature range, the thermal actuator 66 will once again be activated (through contraction of the thermal material) causing the valve mechanism to return to its "open" position once again directing fluid to heat exchanger 112 to be warmed. Accordingly, in the illustrated embodiment, the manifold structure 114 and internal valve assembly 116 are used to sense the temperature of the fluid returning to the transmission 111 so as to direct the fluid exiting the transmission 111 to the appropriate heat exchange component (i.e. to heat exchanger 112 for warming, or to a cooler 113 located elsewhere in the heat exchanger system).

While a particular fluid circuit has been described in connection with the above-described example embodiment, it will be understood that the heat exchanger assembly 100 can be modified or adapted to suit alternate fluid circuits depending upon the particular application. For instance, the manifold structure 114 can be modified to have additional (or fewer) internal fluid channels to allow fluid to be circuited through the manifold structure 114 in a desired pattern or fluid circuit. As well, while a particular valve assembly 116 has generally been described as having a thermal actuator in the form of a "wax motor", it will be understood that the subject embodiment is not limited to a "wax motor" and that any suitable thermal actuator for actuating a valve mechanism may be used. For instance, an electronic valve mechanism can also be used wherein the thermal or temperature responsive actuator is operated by means of a solenoid having a solenoid coil and central actuator shaft coupled to the valve disk. Therefore, it will be understood that wax motors, electronic valve mechanisms or any other suitable, temperature responsive valve mechanism known in the art may be used in conjunction with the described heat exchanger assembly 100 depending upon the particular application and the desired function of the valve and heat exchanger assembly 100.

Additionally, while the manifold structure 114 has been described as having an internal valve cavity 117 adapted to receive the components of a valve mechanism, the internal valve cavity being sealed to the outside by valve cap 140, it will be understood that the manifold structure 114 is not limited to this particular structure and that the manifold structure 114 can be adapted to receive an external valve assembly that is mechanically joined to the manifold structure 114, similar to the embodiment described in connection with FIGS. 1-3 for instance, to form the valve cavity 117 and valve assembly 116.

Another example embodiment of a heat exchanger assembly with integrated valve structure or valve integration unit according to the present disclosure will now be described with specific reference being made to FIGS. 8-12.

In the subject embodiment, the heat exchanger assembly 200 is comprised of a heat exchanger 212 with a valve integration unit in the form of a base plate 214 with integrated valve assembly 216. The heat exchanger 212 is generally in the same form as the heat exchanger 12 described above and, therefore, will not be described in further detail with regard to this example embodiment although reference will be made to the description provided above. However, it will be understood that the heat exchanger assembly 200 is not necessarily limited to the particular heat exchanger arrangement described above and that any suitable heat exchanger, as known in the art, could be used depending upon the particular use/application of the heat exchanger assembly 212.

By way of non-limiting example, in the subject embodiment the heat exchanger assembly 200 is being used as a transmission oil cooler. The heat exchanger 212 is provided, with two fluid connections on its top end plate 36 for the flow of a heat exchange fluid through the heat exchanger 212 (i.e. a suitable heat exchange fluid for cooling/warming) and two fluid connections are provided through the base plate 214 for directing the flow of the other heat exchange fluid (i.e. transmission oil) through the heat exchanger 212. Therefore, in the subject embodiment, the first heat exchange fluid entering the heat exchanger 212 through base plate 214 is oil, while the second heat exchanger fluid flowing through heat exchanger 212 via fluid connections 42, 44 is a suitable fluid for cooling/warming oil.

Base plate 214 is generally an extruded, forged or machined plate that has first surface 216 that is adapted to be brazed directly to the bottom end plate 38 of the heat exchanger 212 and an opposed second surface 218. An internal valve cavity 217 is formed within the body of the base plate 214 and protrudes outwardly from the second surface 218 of the base plate 214. The internal valve cavity 217 serves as a valve chamber and is adapted to receive the components of a valve mechanism 221 which includes a thermal or temperature responsive actuator 66 (i.e. a wax motor or an electronic valve mechanism such as a solenoid valve or any other suitable valve mechanism), as described above in connection with the other example embodiments. A valve cap 240 seals the valve mechanism and closes the internal valve cavity 217. In the illustrated embodiment, the thermal actuator 66 includes an actuator piston 68 moveable between a first position and a second position by means of expansion/contraction of the wax (or other suitable material) contained in the thermal actuator 66 which expands/contracts in response to the temperature of the fluid entering the internal valve cavity 217. The actuator piston 68 may also be controlled by activation of a solenoid coil or any other suitable valve activation means. A spool-type valve member is operably coupled to the thermal actuator 66, the valve member having spaced apart first and second valve disks 71, 73. The first valve disk 71 is adapted to seal against a corresponding valve seat 219 formed in the valve cavity 217 when the valve mechanism 221 is position to allow fluid to be directed from the transmission to heat exchanger 212 for cooling/warming. The second valve disk 73 is adapted to seal against a valve seat 241 provided by and end of the valve cap 240 that extends into the internal valve chamber 217 when the valve mechanism 221 is positioned to direct fluid away from or allow the fluid to bypass heat exchanger 212 and be returned to the transmission, as will be described in further detail below.

While valve mechanism 221 has generally been described as having a thermal actuator 66 in the form of a "wax motor", as with the above-described embodiments, it will be understood that the subject embodiment is not limited to a "wax motor" and that any suitable thermal or temperature responsive actuator for actuating a valve mechanism may be used. For instance, an electronic valve mechanism can also be used wherein the thermal or temperature responsive actuator is operated by means of a solenoid having a solenoid coil and central actuator shaft coupled to the valve disk or spool-type valve member. Therefore, it will be understood that wax motors, electronic valve mechanisms or any other suitable, temperature responsive valve mechanism known in the art may be used in conjunction with the described heat exchanger assembly 200 depending upon the particular application and the desired function of the valve and heat exchanger assembly 200.

Base plate 214 is provided with fluid ports 220, 222 on the second surface thereof to allow the first heat exchanger fluid, i.e. the transmission oil, to enter and exit the heat exchanger assembly 200. In the illustrated embodiment, fluid port 220 serves as an inlet port and is adapted to receive the first heat exchange fluid, i.e. oil from an automobile transmission, while fluid port 222 serves as an outlet port for directing the first heat exchange fluid out of the heat exchanger assembly 200 and returning the fluid to the transmission. A first fluid channel 224 is formed within the first surface of the base plate 214 which interconnects fluid port 220 and internal valve cavity 217 by means of a valve inlet port 226. A second fluid channel 228 formed in the first surface of the base plate 214 interconnects the internal valve cavity 217 and fluid outlet port 222 by means of a valve outlet port 230. The second fluid channel 228 has a branch 229 that extends beyond fluid port 222, branch 229 having an end 232 that is adapted to align with and seal against the first fluid outlet manifold (i.e. the oil outlet manifold) of heat exchanger 214. Therefore, second fluid channel 228 is adapted to either direct fluid exiting the internal valve cavity 117 out of the heat exchanger assembly 200 and back to the automobile transmission through outlet port 222 or to direct fluid exiting the heat exchanger 212 (through branch 229) out of the heat exchanger assembly 200 and back to the automobile transmission, depending upon the particular position of the valve mechanism or thermal actuator 66. The base plate 214 further includes a third fluid channel 234 which is in fluid communication with internal valve cavity 217 by means of a second valve outlet port 236, the third fluid channel 234 having an end 238 that is adapted to align with and seal against the first fluid inlet manifold of heat exchanger 212.

The fluid circuiting through heat exchanger assembly 200 will now be described in further detail. In the example embodiment of the heat exchanger assembly 200 being used as a transmission oil cooler, the oil (or first heat exchange fluid) exits the automobile transmission and enters heat exchanger assembly 200 through fluid port 220. The fluid then travels through first fluid channel 224 where it enters the internal valve cavity 217 through inlet port 226 where the temperature of the fluid is "sensed" by the thermal actuator (or temperature responsive actuator) 66. During automobile start-up conditions, for example, the transmission oil is "cold" and has not reached its optimal operating temperature and, therefore, does not require "cooling". Therefore, at this stage, the valve mechanism or thermal actuator 66 is in its "closed" or bypass position (i.e. cold condition shown in FIG. 9) with valve disk 71 being spaced away from valve seat 219 thereby fluidly connecting the first and second fluid channels 224, 228 through a portion of the internal valve cavity 217, while valve disk 73 is sealed against valve seat 241 thereby preventing fluid from entering heat exchanger 212. Accordingly, rather than having the fluid flow through heat exchanger 212, the fluid bypasses heat exchanger 212 and is directed back to the transmission through outlet port 222. As the temperature of the first heat exchange fluid, i.e. transmission oil, increases, the thermal or temperature responsive actuator 66 is activated by means of expansion of the material/wax within the actuator (or by activation of a solenoid coil, for example, when an electronic solenoid valve mechanism is used) thereby causing the second valve disk 73 to move away from valve seat 241 and valve disk 71 to be moved into sealing engagement against valve seat 219. Therefore, the valve mechanism moves from its closed or bypass position to its open position wherein a fluid connection is provided between the first fluid channel 224 and the third fluid channel 234 by means of a portion of the internal valve cavity 217. The first heat exchanger fluid, therefore, enters the heat exchanger assembly 200 through inlet port 220, flows through fluid channel 224 and enters the internal valve cavity 217 via inlet port 226. The fluid then flows though the internal valve cavity 217 and enters the third fluid channel 234 through outlet port 236 where it travels through the third fluid channel 234 and is directed to the oil inlet manifold of heat exchanger 212. The oil flows through the heat exchanger 212 and is directed back to the transmission through the branch portion 229 of the second fluid channel 228 and out of the heat exchanger assembly 200 through outlet port 222.

A heat exchanger assembly 300 according to another example embodiment will now be described with specific reference to FIGS. 13-24.

Heat exchanger assembly 300 comprises a heat exchanger 312 and a valve integration unit 314. The heat exchanger 312 is generally in the same form as the heat exchangers 12 and 212 described above, comprising a stack of nested, dished heat exchanger plates 316, 318. The heat exchanger plates 316, 318 are disposed in alternating, stacked, brazed relation to one another forming alternating first and second fluid flow passages 308, 310 therebetween (FIG. 14) for the flow of first and second fluids, respectively, through the heat exchanger 312.

Figure 13:
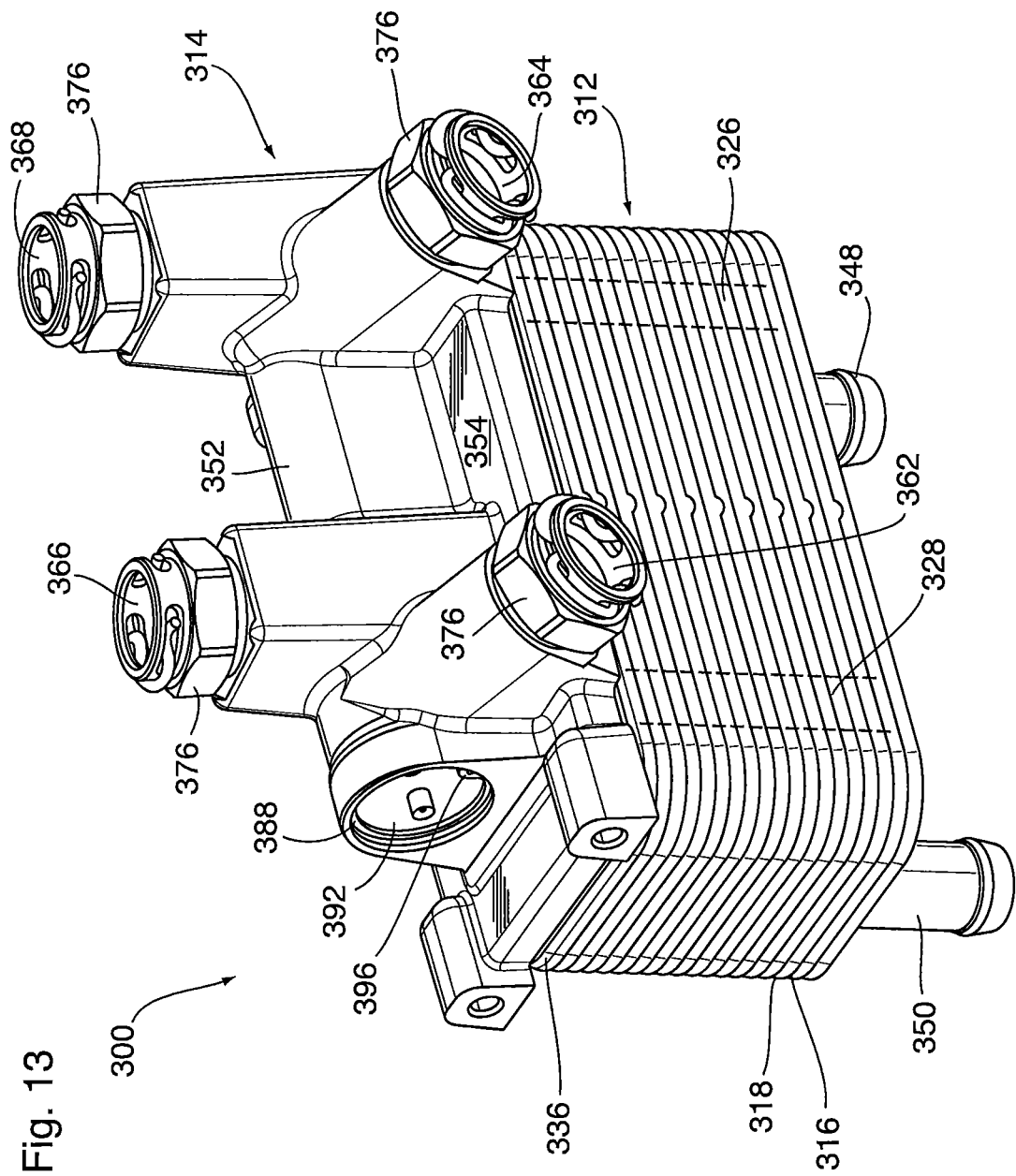
FIG. 13 is a perspective top view of a heat exchanger assembly with an integrated valve structure with a pressure relief feature, according to another example embodiment of the present disclosure.
Figure 13A:
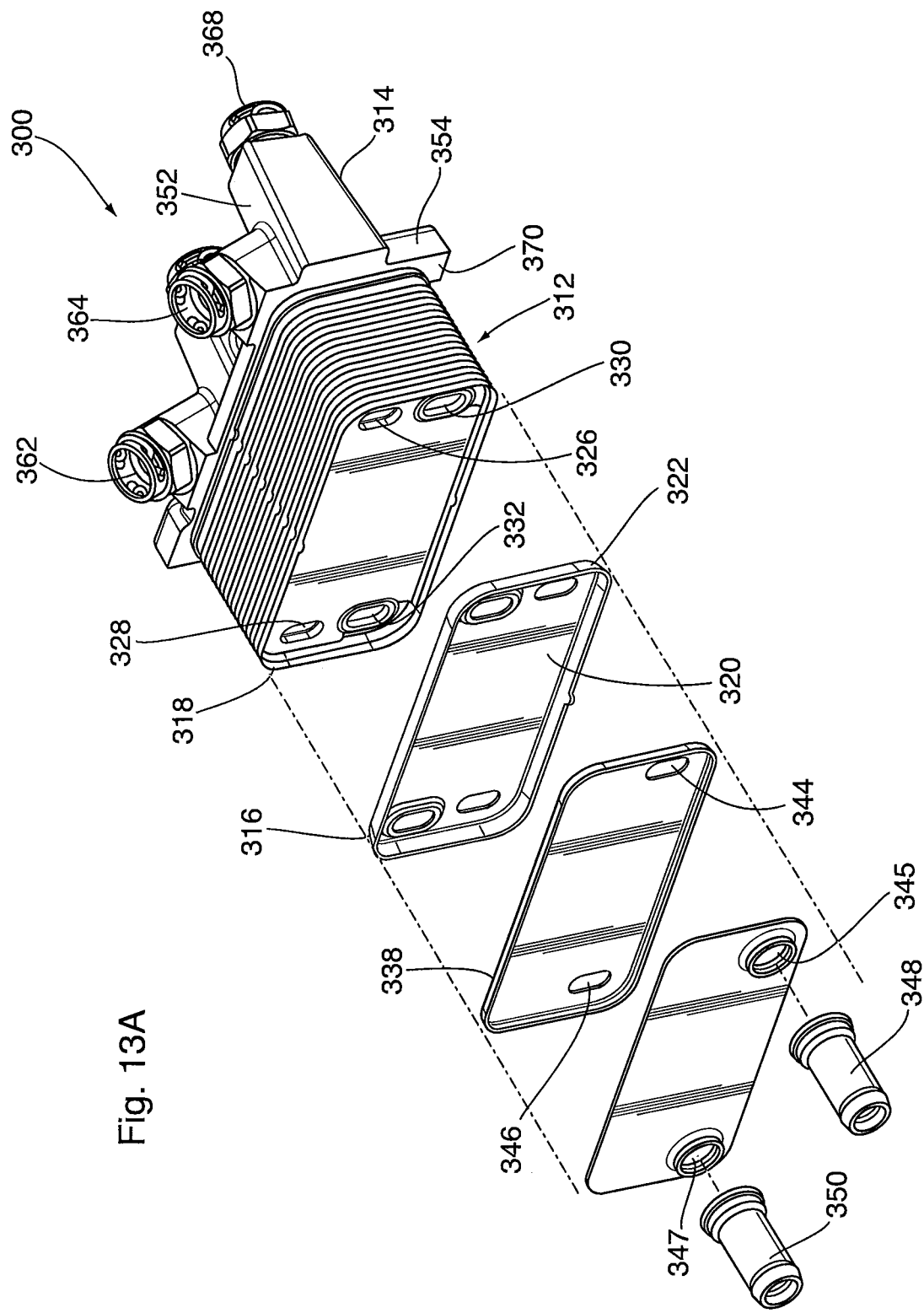
FIG. 13A is a perspective bottom view of the heat exchanger assembly of FIG. 13, in a partially disassembled state.
Figure 14:
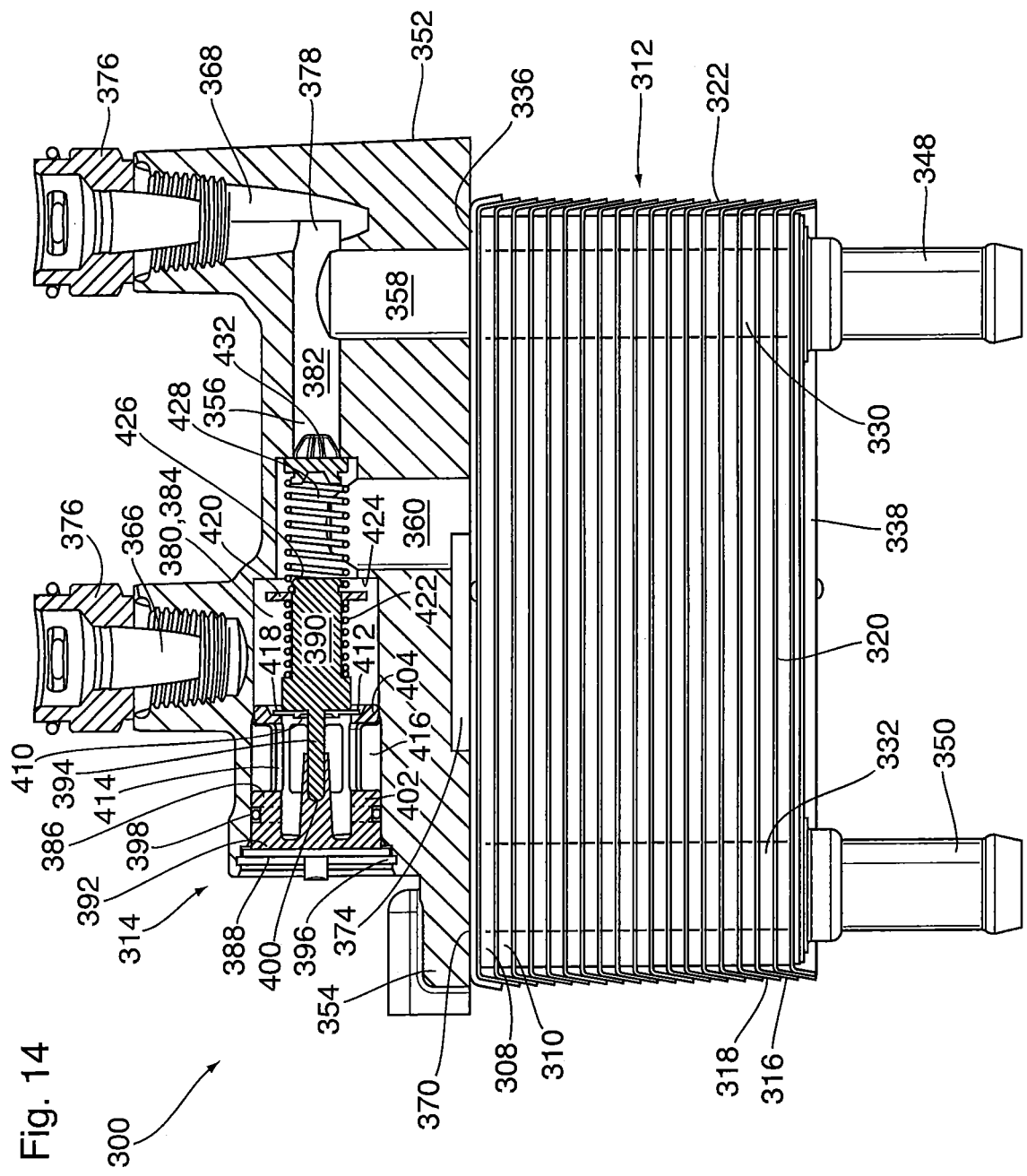
FIG. 14 is a longitudinal cross-section along line 14-14' of FIG. 13.

As best seen in FIG. 13A, heat exchange plates 316, 318 each comprise a generally planar base portion 320 surrounded on all sides by sloping edge walls 322. The heat exchange plates 316, 318 are stacked one on top of another with their edge walls 322 in nested, sealed engagement. Each heat exchange plate 316, 318 is provided with four fluid openings near its four corners, each of which serves as an inlet/outlet for a fluid to enter/exit one of the first or second fluid flow passages formed between the plates 316, 318. Two of the four fluid openings are raised with respect to the base portion of the plate while the other two fluid openings are formed in and are co-planar with the base portion 320 of the plate 316, 318. The raised openings in one plate 316 or 318 align with and seal against the flat or co-planar openings of the adjacent plate 316 or 318, thereby spacing apart the adjacent plates 316, 318 and defining the alternating first and second fluid passages 308, 310 therebetween.

As also shown in FIG. 13A, the aligned fluid openings in the stacked plates 316, 318 form four manifolds, including first and second manifolds 326, 328 coupled together by the first fluid flow passages 308, and third and fourth manifolds 330, 332 coupled together by the second fluid flow passages 310. One of the first or second fluids can be oil (i.e. engine oil or transmission oil) while the other fluid can be a standard, known liquid for cooling/heating oil. In the present embodiment, the first fluid is transmission oil, and the second fluid is a liquid coolant, such as water, glycol, or a mixture thereof. During operation of assembly 300, heat is exchanged between the oil and the coolant, so as to heat and/or cool the oil. In an exemplary embodiment, the heat exchanger 312 is a transmission oil heater, wherein heat is transferred from engine coolant to transmission oil.

Either the first or second manifold 326, 328 can be an inlet manifold or an outlet manifold, depending on the direction of flow of the first fluid. Similarly, either the third or fourth manifold 330, 332 can be an inlet manifold or an outlet manifold, depending on the direction of flow of the second fluid.

Figure 19:
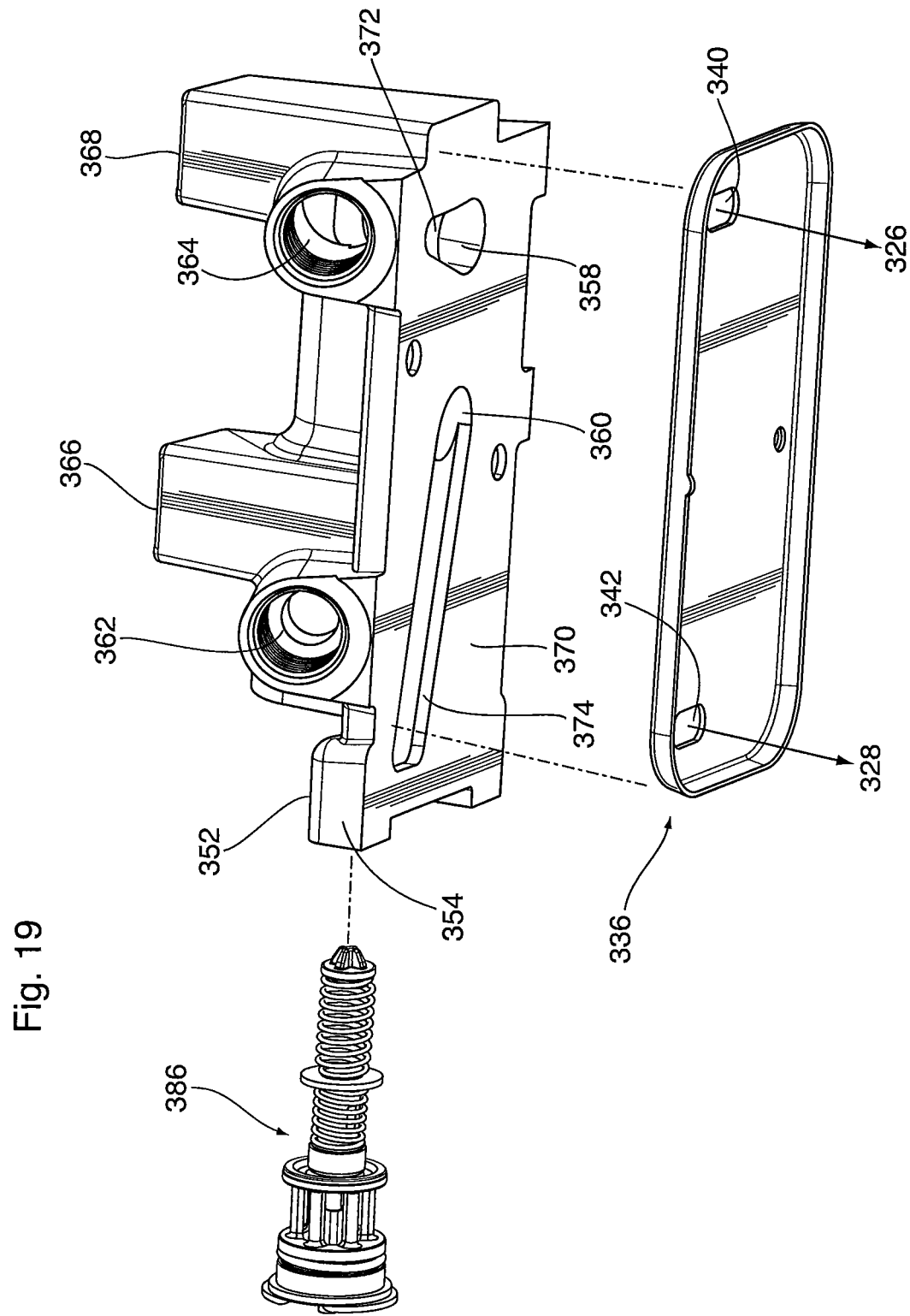
FIG. 19 is a perspective bottom view of the housing, together with the valve mechanism and the first end plate of the heat exchanger.
Figure 20:
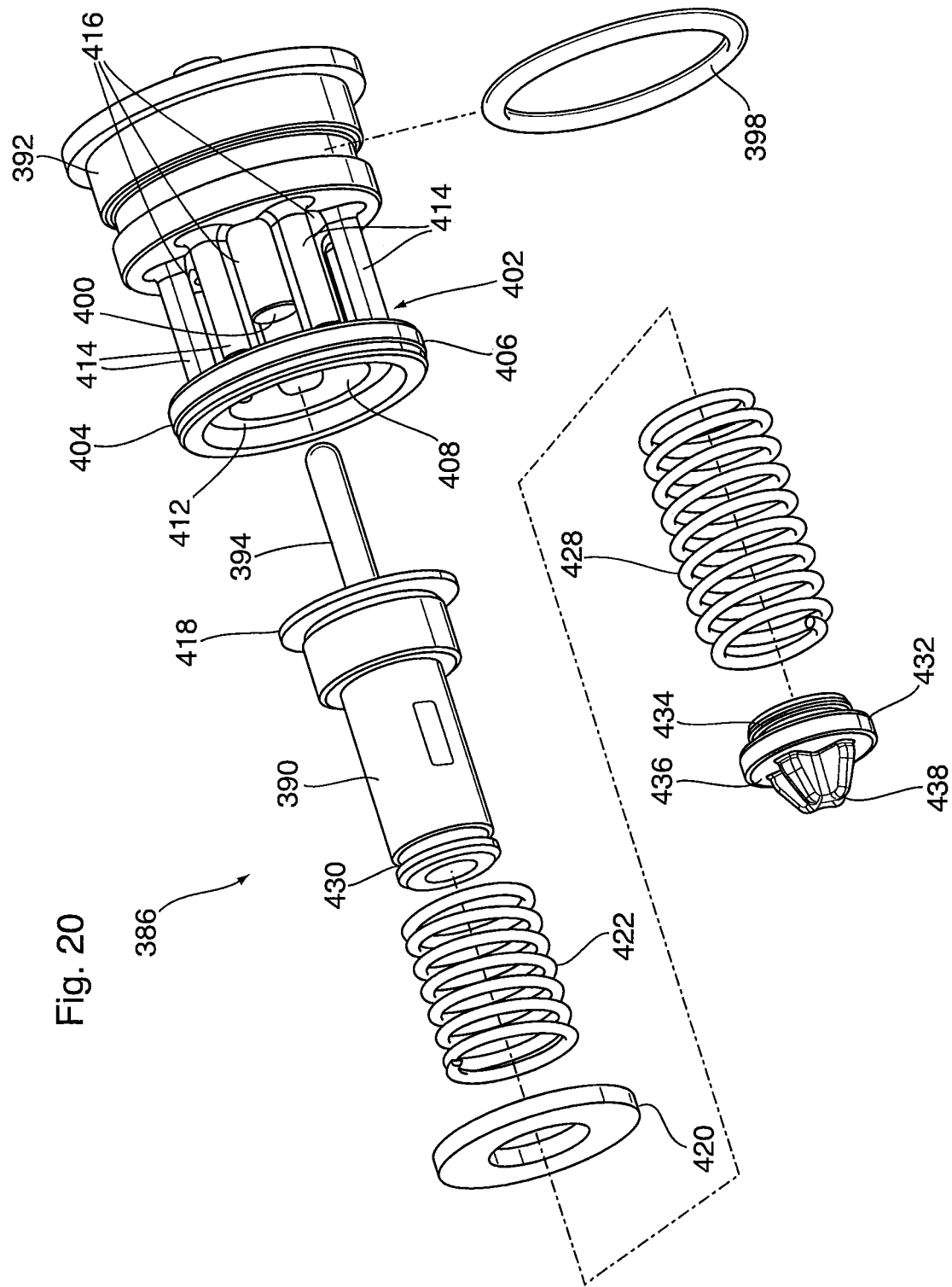
FIG. 20 is an exploded view of the valve mechanism.

First and second end plates 336, 338 are provided at opposite ends of the stack of heat exchange plates 316, 318. First end plate 336 is best seen in FIG. 19, and second end plate 338 is best seen in FIG. 13A. Depending upon the particular application, the end plates 336, 338 may comprise one or more fluid openings, each of which is in fluid communication with one of the manifolds 326, 328, 330, 332, for the input/output of the first and second heat exchange fluids into/out of the heat exchanger 312. The first end plate 336 is provided with two fluid openings 340, 342 which are aligned with, and in fluid communication with, the respective first and second manifolds 326, 328. The second end plate 338 has two fluid openings 344, 346 which are aligned with, and in fluid communication with, the respective third and fourth manifolds 330, 332. It will be understood, however, that various other configurations are also contemplated and included within the scope of the present disclosure, wherein each of the first and second end plates 336, 338 has from zero to four fluid openings, with the combined number of fluid openings in plates 336, 338 being four.

In the present embodiment, the openings 344, 346 in second end plate 338 provide for input and output of the second fluid to and from the third and fourth manifolds 330, 332 and the plurality of second fluid flow passages 310. Where the second fluid is a liquid coolant, the openings 344, 346 form the coolant inlet and outlet ports of heat exchanger 312, and are provided with tubular coolant fittings 348, 350 for connection of the heat exchanger 312 to the coolant circulation conduits of the vehicle, as discussed further below. As seen in FIG. 13A, the fittings 348, 350 may be mounted to an adapter plate 339 having a pair of openings 345, 347 which are aligned with the openings 344, 346 in second end plate 338.

Figure 17:
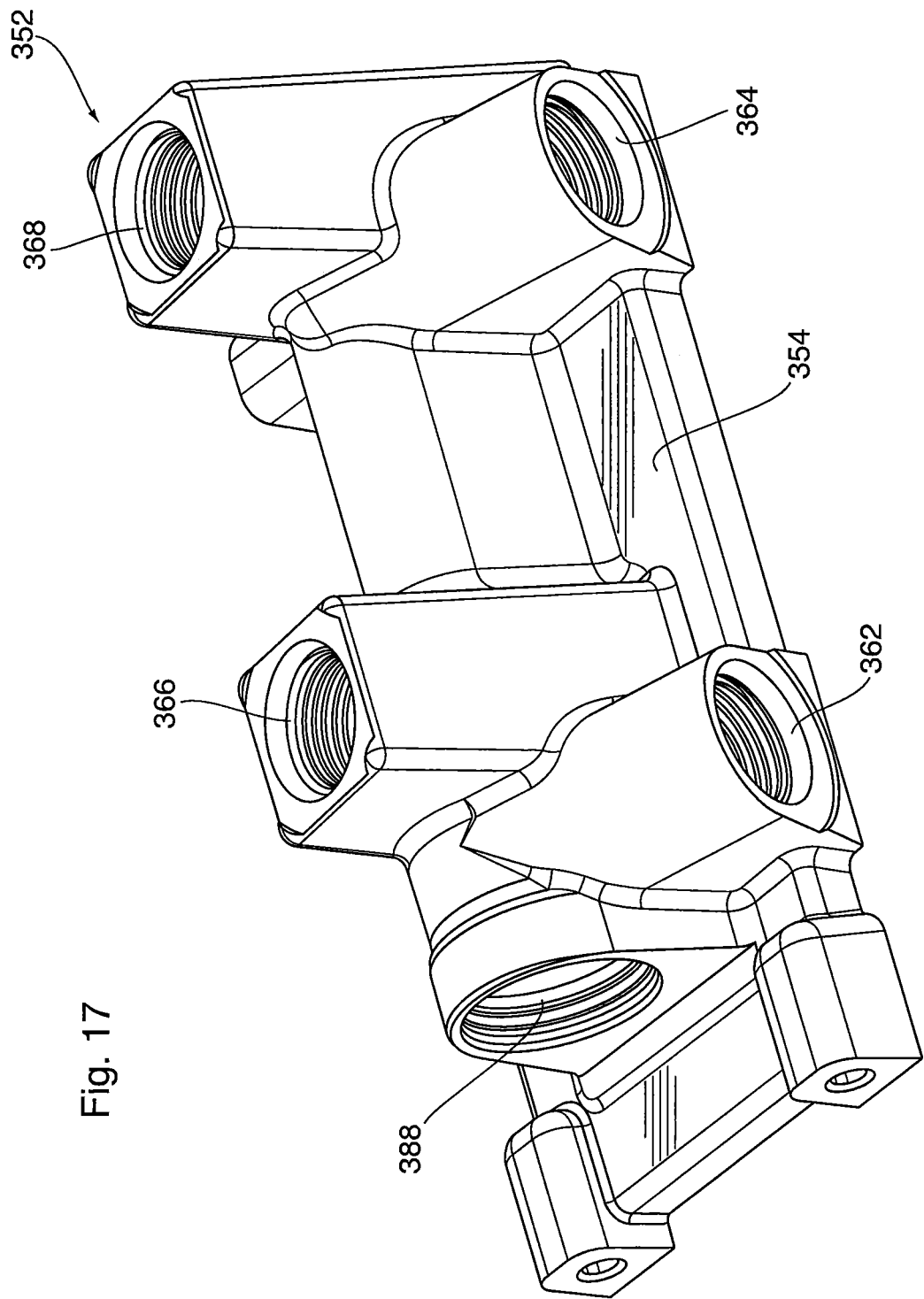
FIG. 17 is a perspective top view of the housing of the valve integration unit in the heat exchanger assembly of FIG. 13.
Figure 18:
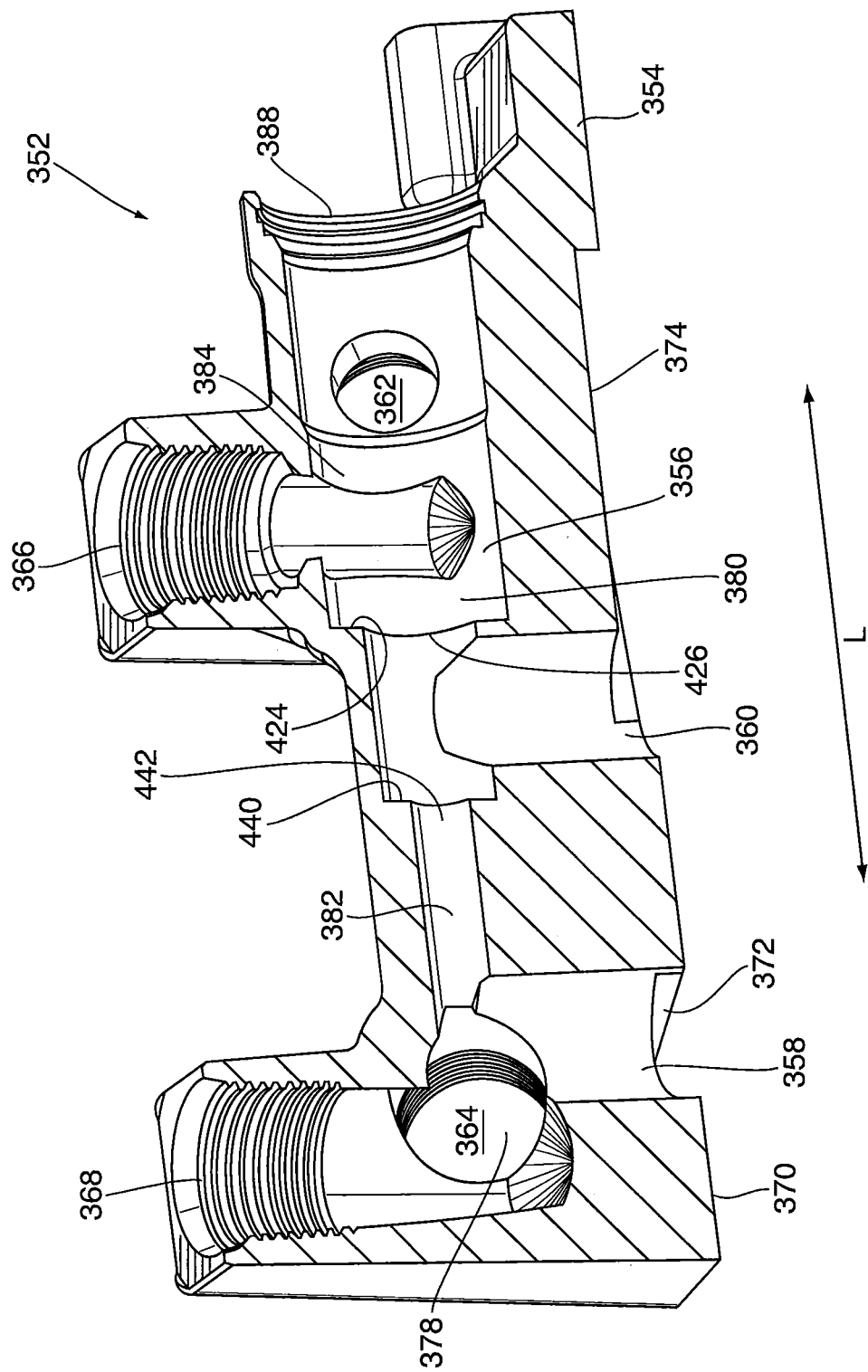
FIG. 18 is a longitudinal cross-section along line 18-18' of FIG. 17.

Valve integration unit 314 comprises a housing 352 which is shown in detail in FIGS. 17-19. The housing 352 includes a base plate 354 for connection to the heat exchanger 312, an interior space 356, and six oil ports 358, 360, 362, 364, 366 and 368, all of which are in fluid communication with the interior space 356. The housing 352 may have a unitary, one-piece construction, and may be formed by casting, extrusion, forging and/or machining.

The base plate 354 has a bottom surface 370 that is adapted to be sealingly joined to the first end plate 336 of the heat exchanger 312. The first and second oil ports 358, 360 extend through the base plate 354 from the bottom surface 370 to the interior space 356, to provide fluid communication between the interior space 356 and the respective first and second manifolds 326, 328 of heat exchanger 312. Depending on the required arrangement of oil ports in the housing 352, the first oil port 358 and/or the second oil port 360 may not be in direct alignment with respective fluid openings 340, 342 in the first end plate 336, or with the first and second manifolds 326, 328 of heat exchanger 312. Accordingly, the base plate 354 may be provided with communication slots having a first end in fluid communication with one of the first and second oil ports 358, 360, and a second end aligned with and in fluid communication with one of the fluid openings 340, 342 of the first end plate 336. In the present embodiment, a first communication slot 372 is formed along the bottom surface 370 of the base plate 354 to provide fluid communication between the first oil port 358 and the fluid opening 340 in the first end plate 336, and a second communication slot 374 is formed along the bottom surface 370 of the base plate 354 to provide fluid communication between the second oil port 360 and the fluid opening 342 in the first end plate 336. The first and second oil ports 358, 360 therefore permit input and output of oil to and from heat exchanger 312, and provide fluid communication between the internal space 356 of housing 352 and the first and second manifolds 326, 328 and the plurality of first fluid flow passages 308.

Each of the third, fourth, fifth and sixth oil ports 362, 364, 366, 368 is open to the interior space 356 of housing 352 at a first terminal end, and has an opposite, outer terminal end which is adapted for connection to an external fluid conduit. In the present embodiment, the outer terminal ends of the third, fourth, fifth and sixth oil ports 362, 364, 366, 368 are internally threaded, for engagement with externally threaded fluid connection fittings, such as quick-connect fittings 376. The third and fourth oil ports 362, 364 project sidewardly from the interior space 356, and the fifth and sixth oil ports 366, 368 project upwardly from the exterior space 356. However, it will be appreciated that the spatial arrangement and direction of oil ports 362, 364, 366, 368 is specific to each particular application, and is variable.

It can be seen from the cross-section of FIG. 18 that the inner terminal ends of the fourth and sixth oil ports 364, 368 are in close proximity to one another and to the first oil port 358, and are all in fluid communication with a first portion 378 of the interior space 356, such that the first, fourth and sixth oil ports 358, 364, 368 are all in fluid communication with each other and with the first manifold 326 of the heat exchanger 312.

It can also be seen from FIG. 18 that the inner terminal ends of the third and fifth oil ports 362, 366 are in close proximity to one another and to the second oil port 360, and are all in fluid communication with a second portion 380 of the interior space 356, such that the second, third and fifth oil ports 360, 362, 366 are all in fluid communication with each other and with the second manifold 328 of the heat exchanger 312. It can also be seen that the second, third and fifth oil ports 360, 362, 366 are spaced apart from one another along a longitudinal axis L, with the fifth oil port 366 being located between the second and third oil ports 360, 362.

The first and second portions 378, 380 of the interior space 356 are spaced apart along the longitudinal axis and are fluidly isolated from one another, except through heat exchanger 312 and through a third portion of interior space 356, comprising a bypass flow passage 382 in the form of an internal, longitudinally extending bore inside the housing 352.

The second portion 380 of the interior space 356 defines a valve chamber 384 to house a valve mechanism 386 for controlling flow of oil between the first to sixth oil ports 358, 360, 362, 364, 366, 368 of the housing 352. The housing 352 also includes a valve insertion opening 388 at one end of the interior space 356, permitting the insertion of the valve mechanism 386 into the valve chamber 384.

The valve mechanism 386 includes a thermal or temperature responsive actuator 390 (i.e. a wax motor or an electronic valve mechanism such as a solenoid valve or any other suitable valve mechanism), as described above in connection with the other example embodiments. A valve cap 392 seals the valve mechanism 386 and sealingly closes the valve insertion opening 388. In the illustrated embodiment, the actuator 390 is a thermal actuator including an actuator piston 394 moveable between a first position and a second position by means of expansion/contraction of a wax (or other suitable material) contained in the actuator 390 which expands/contracts in response to the temperature of the first fluid entering the valve chamber 384. The actuator piston 394 may instead be controlled by activation of a solenoid coil or any other suitable valve activation means.

The valve cap 392 is retained within valve insertion opening 388 by a resilient spring clip 396 which is received inside an annular groove located at the valve insertion opening 388, and abuts against an outer face of the valve cap 392. The cap 392 is sealed within opening 388 by a resilient element such as an O-ring 398 received between an outer surface of the valve cap 392 and an inner surface of the interior space 356, with the O-ring 398 being received in a groove in the outer surface of valve cap 392.

The valve cap 392 includes a depression 400 on its inner face in which the end of the piston 394 is received, and the valve mechanism 386 further includes a spool member 402 integrated with the valve cap 392, the spool member 402 comprising an annular end portion 404 having an outer surface 406 sealingly engaged with an inner surface of the interior space 356, and an inner surface 408 defining a circular end opening comprising a first valve opening 410. The annular end portion 404 also has a flat, planar, annular end face defining a first valve seat 412.

The spool member 402 further comprises a plurality of spaced-apart longitudinal ribs 414 joining the valve cap 392 to the annular end portion 404, wherein flow openings 416 are defined between the ribs 414. It can be seen from FIGS. 15 and 16 that the annular end portion 404, the first valve seat 412 and the first valve opening 410 are located within the second portion 380 of interior space 356, between the third oil port 362 and the fifth oil port 366, which are longitudinally spaced apart from one another.

A first valve member 418 in the form of an annular disc is carried on a first end of the valve actuator 390, and a second valve member 420 in the form of an annular disc is slidably received on an outer cylindrical surface of the valve actuator 390. The second valve member 420 is biased toward the second end of the valve actuator 390 by a first end of a first spring member 422 in the form of a coil spring which is provided around the outer cylindrical surface of the valve actuator 390, and also has a second end which abuts against an annular shoulder of the valve actuator 390.

A second valve seat 424 is provided by an annular shoulder formed in the second portion 380 of interior space 356, the shoulder being formed by a reduction in diameter in the second portion 380 of interior space 356. The second valve seat 424 is flat and planar and adapted for sealed engagement with the second valve member 420, and the second valve seat 424 defines a second valve opening 426. It can be seen from FIG. 18 that the second valve seat 424 and the second valve opening 426 are located within the second portion 380 of interior space 356, between the second oil port 360 and the fifth oil port 366, which are longitudinally spaced apart from one another. The first spring member 422 acts as a return spring which opposes longitudinal motion of the second valve member 420 away from the second valve seat 424, and which also opposes longitudinal motion of the first valve member 418 away from the first valve seat 412.

A second spring member 428 in the form of a coil spring extends longitudinally from the second end of the valve actuator 390 and through the reduced-diameter portion of interior space 356 which provides fluid communication between the second valve opening 426 and the second oil port 360. The second spring member 428 acts as a return spring which opposes longitudinal motion of the second valve member 420 toward the second valve seat 424 (acting as a counter-spring relative to first spring member 422), and which opposes longitudinal motion of the first valve member 418 toward the first valve seat 412.

The first end of second spring member 428 is secured within an annular groove 430 at the second end of the valve actuator 390, and the opposed second end of second spring member 428 is secured to a third valve member 432 in the form of a valve plug. The third valve member 432 has a groove 434 at its first end, in which the second end of second spring member 428 is secured, and has a second end defining an annular sealing surface 436, the sealing surface 436 surrounding a tapered end portion 438.

A third valve seat 440 is provided by an annular shoulder formed in the second portion 380 of interior space 356, longitudinally spaced from the second valve seat 424. This annular shoulder is formed by a further reduction in diameter of the interior space 356. The third valve seat 440 is flat and planar and adapted for sealed engagement with the annular sealing surface 436 of the third valve member 432, and the third valve seat 440 defines a third valve opening 442 which is sized to receive the tapered end portion 438 and thereby center the third valve member 432 within opening 442. It can be seen from FIG. 18 that the third valve seat 440 and the third valve opening 442 are located within the second portion 380 of interior space 356, between the valve chamber 384 and the bypass flow passage 382.

Figure 15:
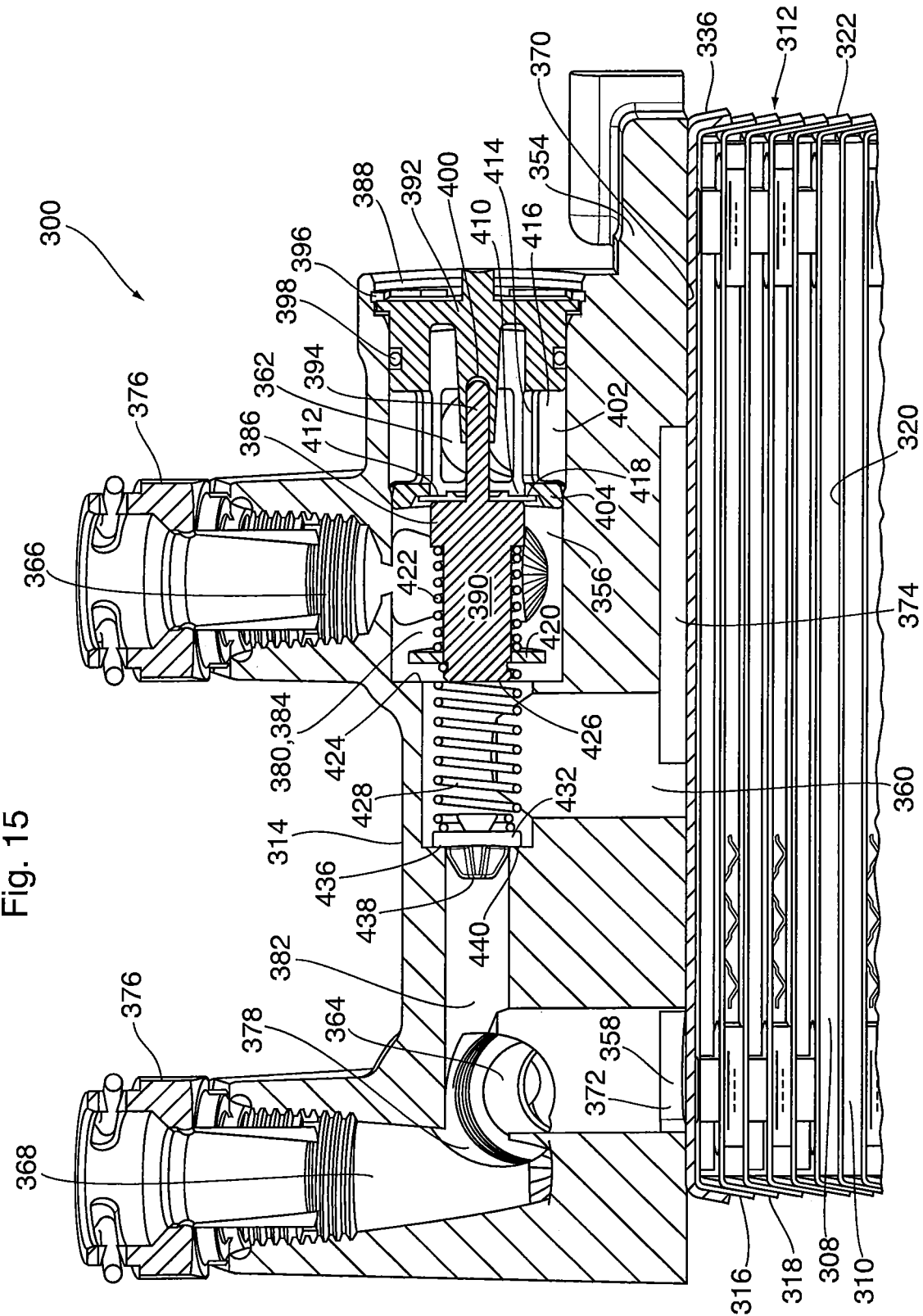
FIG. 15 is a longitudinal cross-section through the heat exchanger assembly of FIG. 13, showing the valve mechanism in a cold state.

FIG. 15 shows the valve mechanism 386 with the piston 394 of actuator 390 in the retracted state. This defines the "cold" state of valve mechanism 386, wherein the wax material inside actuator 390 is in a contracted state. In this cold state of valve mechanism 386, the first valve member 418 is in sealed engagement with the first valve seat 412 of spool member 402, thereby preventing fluid communication between the third oil port 362 and the fifth oil port 366 through first valve opening 410. Also, the second valve member 420 is longitudinally spaced apart from the second valve seat 424, to permit fluid communication between the second oil port 362 and the fifth oil port 366 through the second valve opening 426.

Figure 16:
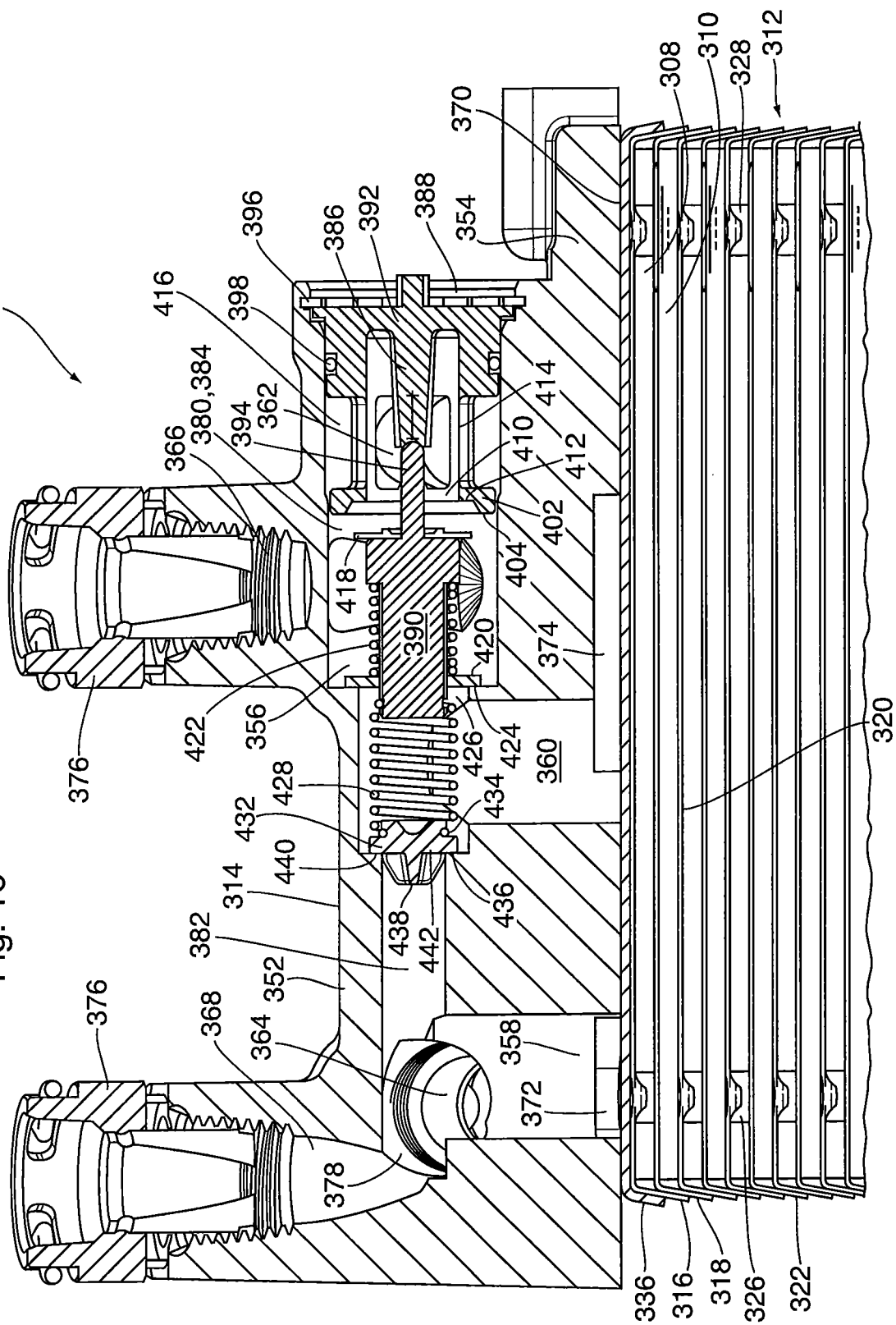
FIG. 16 is a longitudinal cross-section through the heat exchanger assembly of FIG. 13, showing the valve mechanism in a hot state.

FIG. 16 shows the valve mechanism 386 with the piston 394 of actuator 390 in the extended state. This defines the "hot" state of valve mechanism 386, wherein the wax material inside actuator 390 is in an expanded state. In this hot state of valve mechanism 386, the first valve member 418 is longitudinally spaced apart from the first valve seat 412 of spool member 402, thereby permitting fluid communication between the third oil port 362 and the fifth oil port 366 through first valve opening 410. Also, the second valve member 420 is in sealed engagement with the second valve seat 424, to prevent fluid communication between the second oil port 362 and the fifth oil port 366 through the second valve opening 426. Also, in this hot state, the actuator 390 acts against the bias of the first and second spring members 422, 428.

Figure 21:
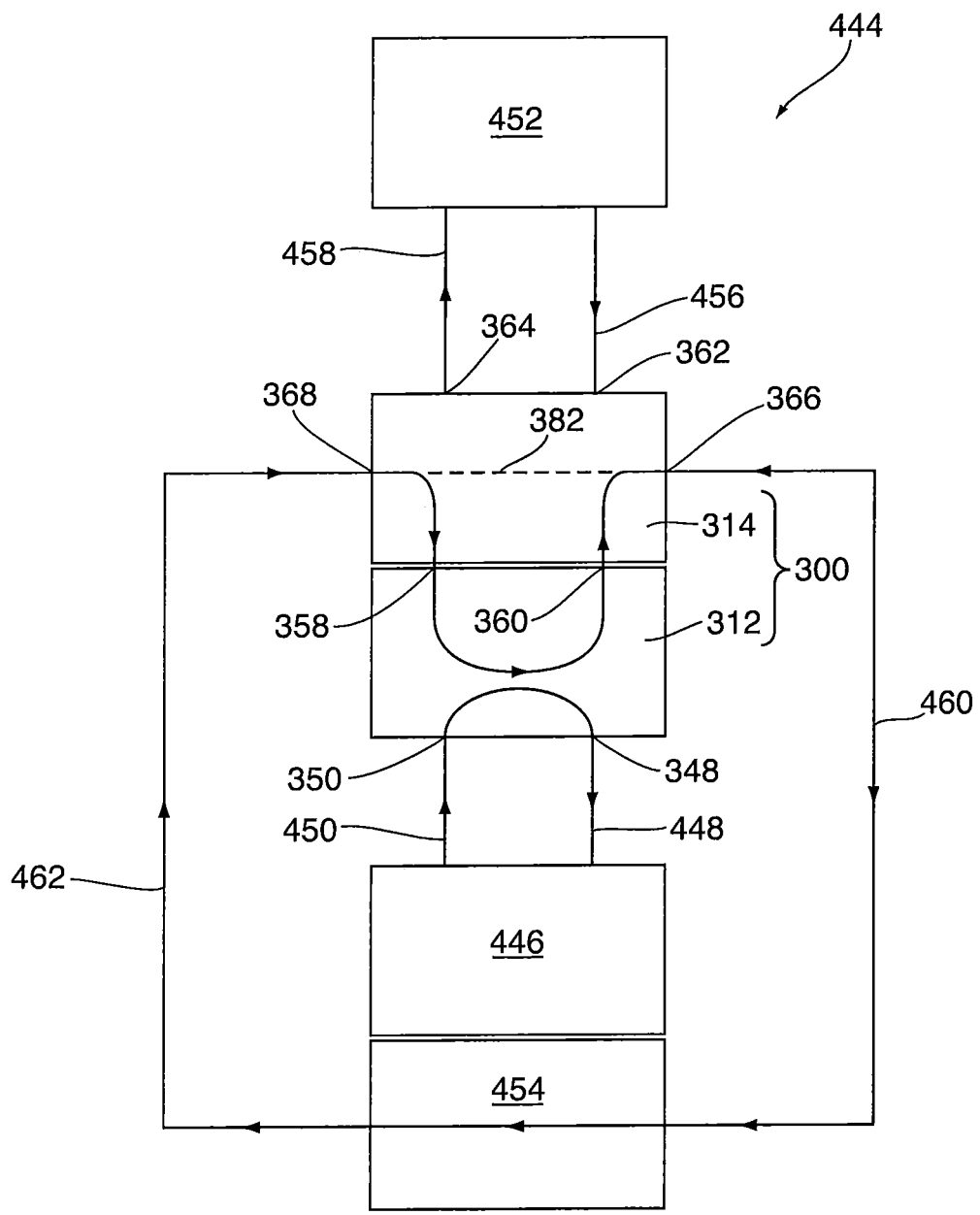
FIG. 21 is a schematic view of a first transmission oil circulation system in a cold state.
Figure 22:
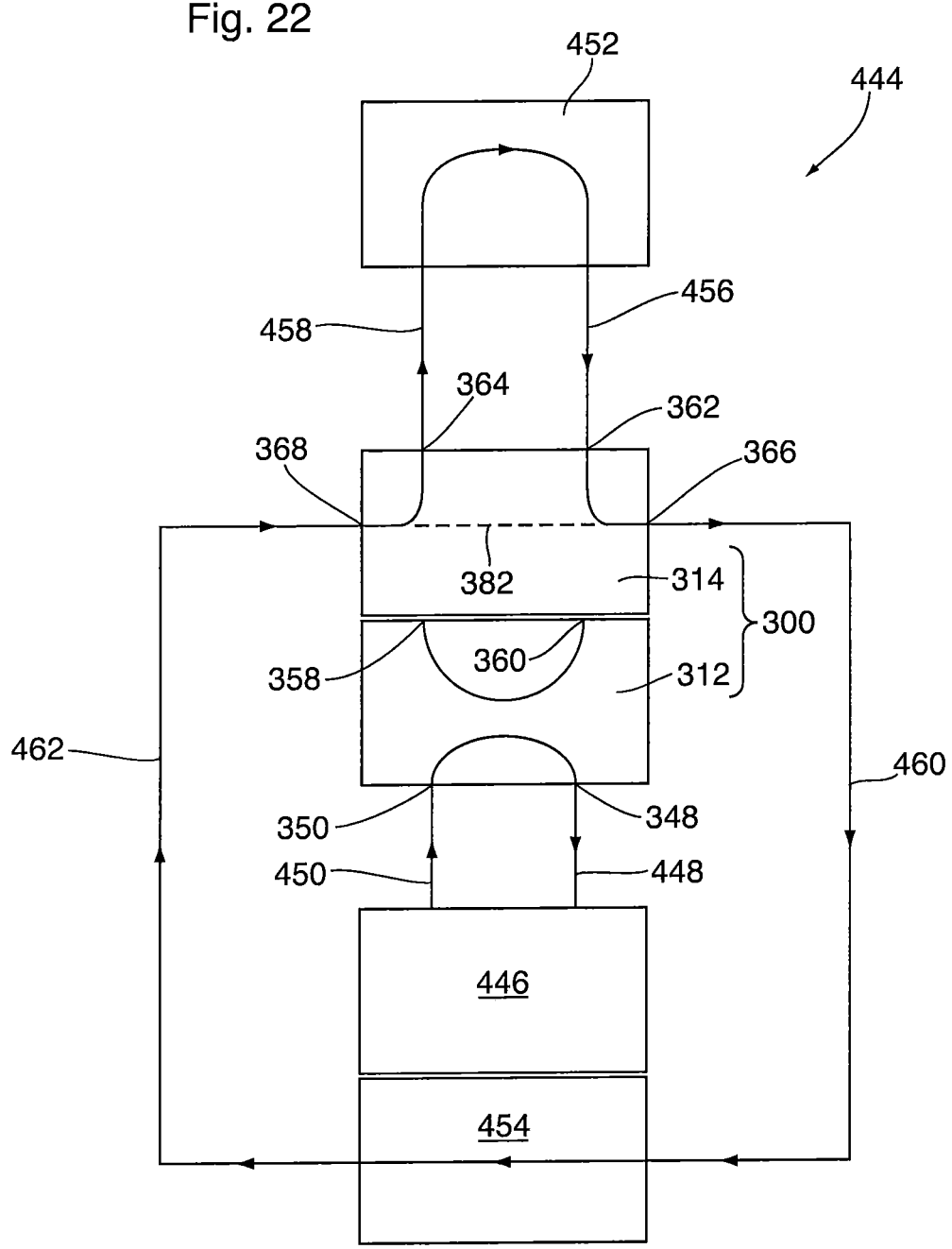
FIG. 22 is a schematic view of the first transmission oil circulation system in a hot state.

FIGS. 21 and 22 schematically show how the heat exchanger assembly 300 may be incorporated into a transmission oil circulation system 444 for controlling the temperature of the transmission oil in a motor vehicle having an internal combustion engine 446 and a transmission 454, wherein the engine coolant is used to alternately heat and cool the transmission oil circulating within system 444. In addition to heat exchanger assembly 300, the transmission oil circulation system 444 also includes a transmission oil cooler (TOC) 452, transmission 454, conduits 456, 458 connecting the heat exchanger assembly 300 to the TOC 452, and conduits 460, 462 connecting the heat exchanger assembly 300 to the transmission 454.

The vehicle also includes a coolant circulation system including the heat exchanger assembly 300, the engine 446, and coolant conduits 448, 450 connecting the coolant inlet and outlet ports of the engine 446 to the coolant fittings 348, 350 of the heat exchanger 312, for circulating the coolant (second fluid) through the third and fourth manifolds 330, 332 and the second fluid flow passages 310 thereof.

In the configuration of system 444 illustrated in FIGS. 21 and 22, the oil conduit 456 extends between the third oil port 362 and an outlet of the TOC, and therefore third oil port 362 is an oil inlet port through which oil is received from the TOC. The oil conduit 458 extends between the fourth oil port 364 and an inlet of the TOC, and therefore the fourth oil port 364 is an oil outlet port through which oil is discharged to the TOC. The oil conduit 460 extends between the fifth oil port 366 and an inlet port of the transmission 454, and therefore the fifth oil port 366 is an oil outlet port 366 through which oil is discharged to the transmission 454. The oil conduit 462 extends between the sixth oil port 368 and the transmission 454, and therefore the sixth oil port 368 is an oil inlet port through which oil is received from the transmission 454. As also shown in FIGS. 21 and 22 the first and second oil ports 358, 360 are internal ports connecting the heat exchanger 312 to the valve integration unit 314, with the first oil port 358 comprising an oil outlet port through which oil is discharged to heat exchanger 312, and the second oil port 360 comprising an oil inlet port through which oil is received from the heat exchanger 312.

In the cold state shown in FIG. 21, with the valve mechanism 386 in the configuration shown in FIG. 15, the transmission oil circulating through system 444 is cold, and the piston 394 of valve actuator 390 is retracted. Such conditions exist, for example, upon initial start-up of the vehicle. Under these conditions, the first valve member 418 is seated against first valve seat 412 and the second valve member 420 is spaced from the second valve seat 424. Thus, oil flow from the second oil port 360 to the fifth oil port 366 through second valve opening 426 is permitted, while oil flow from the third oil port 362 to the fifth oil port 366 through first valve opening 410 is blocked. Under these conditions, cold transmission oil from transmission 454 will flow through oil conduit 462 and enter the first portion 378 of the interior space 356 through the sixth oil port 368. Due to the configuration of valve mechanism 386, the oil entering interior space 356 through sixth oil port 368 will preferentially enter the heat exchanger 312 through the first oil port 358, and will then flow through the first manifold 326, the first fluid flow passages 308, and the second manifold 328, before re-entering the housing 352 through the second oil port 360. The oil then flows through the second valve opening 426 and exits the assembly 300 through the fifth oil port 366, to enter the oil conduit 460 and be returned to the transmission 454.

In the meantime, coolant is heated by engine 446 and is circulated through the second fluid flow passages 310 of heat exchanger 312, where it transfers heat to the transmission oil being circulated through the first fluid flow passages. Thus, the transmission oil is heated in assembly 300 before it is returned to the transmission 454. Also, because the first valve member 418 blocks flow through the first valve opening 410, there will be little or no oil flow from the sixth oil port 368 to the TOC 452 through the fourth oil port 364 with the assembly in the cold state of FIG. 21.

It can be seen that the oil circulating through assembly 300 will flow over and around the valve actuator 390 as it passes through the valve chamber 384 from the second oil port 360 to the fifth oil port 366. Thus, the valve actuator 390 performs a temperature sensing function, and as the temperature of the oil increases, the wax inside actuator 390 will expand and cause the piston 394 to extend. The extension of piston 394 will cause longitudinal movement of the actuator body 390 such that the first valve member 418 will be moved out of engagement with first valve seat 412 to open the first valve opening 410, and the second valve member 420 will be moved into sealed engagement with the second valve seat 424 to close the second valve opening 426.

This movement of valve members 418, 420 will cause the valve mechanism 386 to adopt the configuration shown in FIG. 22, also referred to as the hot state. In this state, the transmission oil circulating through system 444 is above a threshold temperature and requires cooling. Thus, oil flow from the second oil port 360 to the fifth oil port 366 through second valve opening 426 is blocked, while oil flow from the third oil port 362 to the fifth oil port 366 through first valve opening 410 is permitted. Under these conditions, hot transmission oil from transmission 454 will flow through oil conduit 462 and enter the first portion 378 of the interior space 356 through the sixth oil port 368. However, rather than entering heat exchanger 312 through first oil port 358, the oil is diverted to the TOC 452 through oil conduit 458. After being cooled as it passes through TOC 452, the oil is returned to assembly 300 through oil conduit 456, and enters valve chamber 384 through the third oil port 362. The oil then flows over and around the actuator 390 as it passes to the fifth oil port 366 to be discharged from assembly 300, and then flows to the transmission 454 through the oil conduit 460. Therefore, in the hot state, oil from the transmission 454 bypasses the heat exchanger 312 and is cooled in the TOC 452.

As can be seen from FIGS. 15 and 16, the third valve member 432 is positioned to block the third valve opening 442 in both the hot and cold states, independent of the configuration of the actuator 390 and piston 394, and independent of the positions of the first and second valve members 418, 420. Therefore, the third valve member 432 is not temperature actuated. Rather, it can be seen from the drawings that the second spring member 428 biases the third valve member 432 toward the closed position, i.e. with the annular sealing surface 436 sealed against the third valve seat 440. With the third valve opening 442 blocked by third valve member 432, fluid communication between the first and second portions 378, 380 of interior space 356 is prevented.

Under some conditions, the oil pressure in circulation system 444 may increase beyond a normal level. Under these conditions, the oil pressure in the first portion 378 of interior space 356 may become greater than the oil pressure in the second portion 389 of interior space 356. In this regard, the cold transmission oil is relatively viscous and this will increase the pressure drop between the inlet and the outlet of heat exchanger 312, corresponding to the respective first and second oil ports 358, 360. Where the pressure differential between the first and second portions 378, 380 is sufficiently high, the pressure of the oil will overcome the biasing force of the second spring member 428, thereby compressing the second spring member 428 and forcing the third valve member 432 out of engagement with the third valve seat 440, opening the third valve opening 442, and permitting oil to flow between the first and second portions 378, 380 of interior space 356 through the bypass flow passage 382, thereby permitting the oil to bypass the heat exchanger 312. Once the pressure differential between the first and second portions 378, 380 of interior space 356 decreases, the second spring member 428 will force the third valve member 432 into sealed engagement with the third valve seat 440, to once again block oil flow through the bypass flow passage 382.

It can be seen from the above discussion that the second spring member 428 performs multiple functions, i.e. functioning as a return spring which opposes longitudinal motion of the second valve member 420 toward the second valve seat 424, as a return spring which opposes longitudinal motion of the first valve member 418 toward the first valve seat 412, and as a pressure actuator to avoid excessive oil pressures in the circulation system 444.

Figure 23:
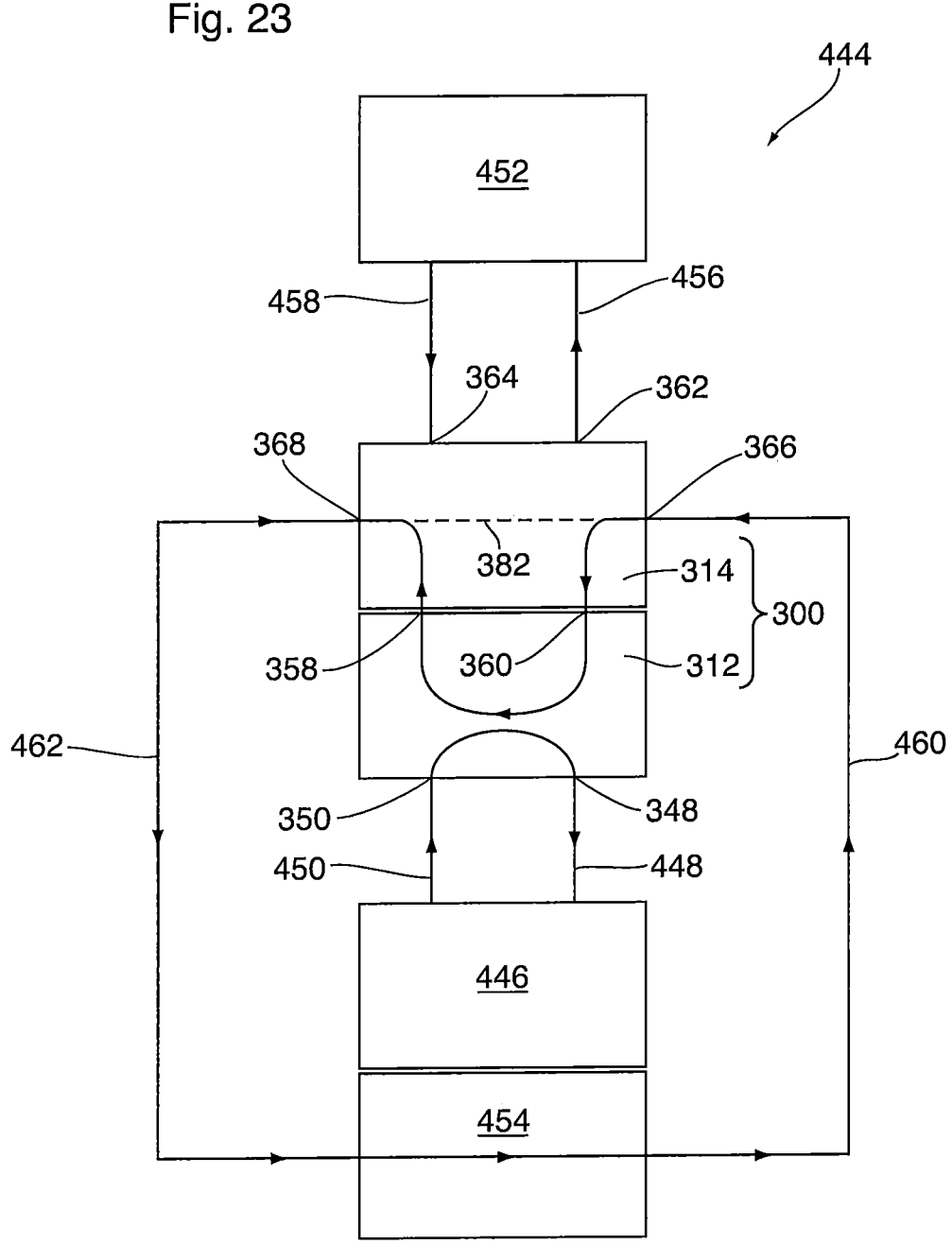
FIG. 23 is a schematic view of a second transmission oil circulation system in a cold state.
Figure 24:
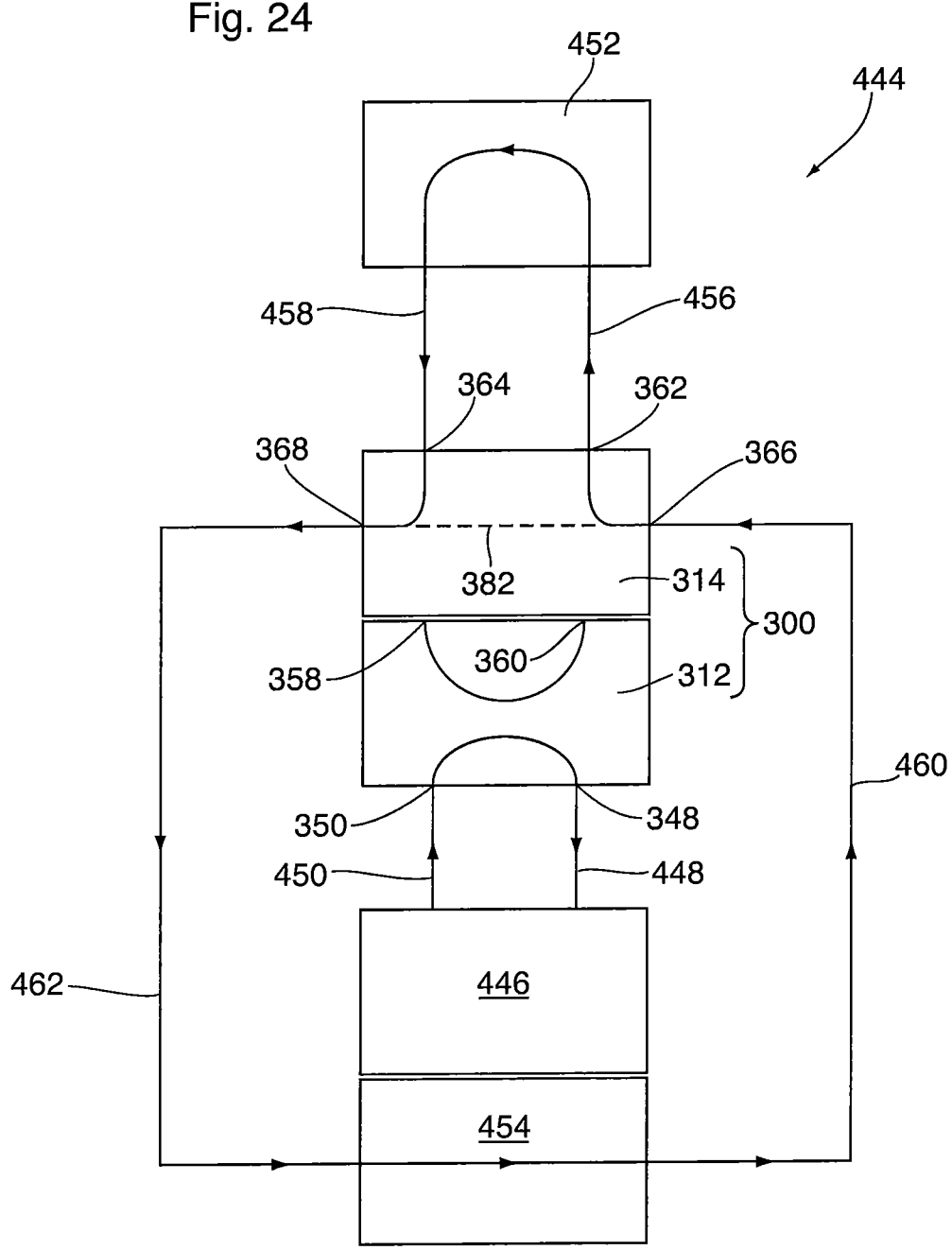
FIG. 24 is a schematic view of the second transmission oil circulation system in a hot state.

From the above description, it can be seen that the valve mechanism 386 is configured to effectively control the output flow of transmission oil from the second manifold 328, which is the oil outlet manifold of heat exchanger 312 in the configuration described above. However, as shown in FIGS. 23 and 24, the direction of flow of the transmission oil through system 444 may be reversed, such that the second manifold 328 becomes the oil inlet manifold of heat exchanger 312, and the valve mechanism 386 will then be configured to effectively control the input flow of transmission oil to the second manifold 328. FIG. 23 shows the cold state of FIG. 444 and FIG. 24 shows the hot state.

While the present invention has been illustrated and described with reference to specific exemplary embodiments of heat exchanger assemblies comprising a heat exchanger with an integrated valve structure or valve integration unit, it is to be understood that the present invention is not limited to the details shown herein since it will be understood that various omissions, modifications, substitutions and changes in the forms and details of the disclosed system and their operation may be made by those skilled in the art without departing in any way from the spirit and scope of the present invention. For instance, while heat exchanger assemblies 10, 100 and 200 have been described with in connection with particular applications for cooling/heating transmission oil, it will be understood that any of the heat exchanger assemblies described herein can be used for various other heat exchange applications and should not be limited to applications associated with the transmission of an automobile system.

What is claimed is:

1. A heat exchanger assembly comprising:
(a) a heat exchanger comprising:
a plurality of alternating first and second fluid flow passages in heat exchange relation;
a first manifold and a second manifold interconnected by the plurality of first fluid flow passages, for flow of a first fluid through the heat exchanger;
a third manifold and a fourth manifold interconnected by the plurality of second fluid flow passages, for flow of a second fluid through the heat exchanger;
(b) a valve integration unit fixedly attached to the heat exchanger, wherein the valve integration unit comprises a housing and a valve mechanism;
(i) the housing comprising:
first to sixth fluid ports, three of said fluid ports being provided for input of the first fluid into the valve integration unit, and three of said fluid ports being provided for output of the first fluid from the valve integration unit;
an interior space comprising a first portion, a second portion and a third portion, the interior space defining a longitudinal axis of the housing;
wherein the second portion of the interior space defines a valve chamber;
wherein the third portion of the interior space defines a bypass flow passage between the first and second portions of the interior space;
wherein the first and second fluid ports provide fluid communication between the interior space of the housing and the first and second manifolds of the heat exchanger, wherein one of the first and second fluid ports is provided for input of the first fluid from the heat exchanger to the valve integration unit, and the other of the first and second fluid ports is provided for output of the first fluid from the valve integration unit to the heat exchanger;
wherein the third and fourth fluid ports provide fluid communication between the interior space of the housing and a first remote vehicle component, wherein one of the third and fourth fluid ports is provided for input of the first fluid from the first remote vehicle component to the valve integration unit, and the other of the third and fourth fluid ports is provided for output of the first fluid from the valve integration unit to the first remote vehicle component;
wherein the fifth and sixth fluid ports provide fluid communication between the interior space of the housing and a second remote vehicle component, wherein one of the fifth and sixth fluid ports is provided for input of the first fluid from the second remote vehicle component to the valve integration unit, and the other of the fifth and sixth fluid ports is provided for output of the first fluid from the valve integration unit to the second remote vehicle component;
wherein the first, fourth and sixth fluid ports of the housing are in fluid communication with each other through the first portion of the interior space; and
wherein the second, third and fifth fluid ports of the housing are in fluid communication with each other through the second portion of the interior space;
(ii) the valve mechanism oriented along the longitudinal axis and comprising:
a temperature responsive actuator;
a first valve member being movable along the longitudinal axis for opening and closing a first valve opening located in the second portion of the interior space, the first valve member and the first valve opening being located between the third fluid port and the fifth fluid port which are longitudinally spaced apart from one another, wherein the movement of the first valve member is actuated by the temperature responsive actuator;
a second valve member being movable along the longitudinal axis for opening and closing a second valve opening located in the second portion of the interior space, the second valve member and the second valve opening being located between the second fluid port and the fifth fluid port which are longitudinally spaced apart from one another, wherein the movement of the second valve member is actuated by the temperature responsive actuator;

a third valve member being movable along the longitudinal axis for opening a third valve opening, the third valve member and the third valve opening being located within the second portion of the interior space, and between the second interior portion and the third interior portion of the interior space;

wherein the third valve member is actuatable to open the third valve opening in response to a fluid pressure differential between the first and second portions of the interior space.

2. The heat exchanger assembly of claim 1, wherein the fifth fluid port is located along the longitudinal axis between the second and third fluid ports.

3. The heat exchanger assembly of claim 1, wherein the first and second valve members are connected to the temperature responsive actuator.

4. The heat exchanger assembly of claim 1, wherein the temperature responsive actuator comprises a generally cylindrical actuator body having a first end and a second end, wherein the first valve member is provided at the first end of the actuator and the second valve member is provided at the second end of the actuator.

5. The heat exchanger assembly of claim 4, wherein the first valve member comprises an annular disc carried on the first end of the temperature responsive actuator.

6. The heat exchanger assembly of claim 4, wherein the second valve member is slidably received on an outer cylindrical surface of the valve actuator, and is biased toward the second end of the actuator by a first spring member comprising a coil spring which is provided around the outer cylindrical surface of the actuator.

7. The heat exchanger assembly of claim 1, wherein the heat exchanger is a transmission oil heater;

wherein the first fluid is transmission oil;
wherein the first remote vehicle component which is in fluid communication with the interior space through the third and fourth fluid ports comprises a transmission oil cooler; and
wherein the second remote vehicle component which is in fluid communication with the interior space through the fifth and sixth fluid ports comprises a transmission.

8. The heat exchanger assembly of claim 1, wherein the housing has a unitary, one-piece construction, and includes a base plate connected to the heat exchanger;

wherein the base plate has a bottom surface which is sealingly joined to a first end plate of the heat exchanger; and
wherein the first and second fluid ports extend through the base plate from the bottom surface to the interior space, to provide fluid communication between the interior space and the first and second manifolds of the heat exchanger.

9. The heat exchanger assembly of claim 1, wherein the first and second portions of the interior space of the housing are spaced apart along the longitudinal axis and are fluidly separated from one another, except through the heat exchanger and through the third portion of the interior space; and wherein the third portion of the interior space comprises said bypass flow passage and is in the form of an internal, longitudinally extending bore inside the housing.

10. The heat exchanger assembly of claim 1, wherein the housing includes a valve insertion opening at one end of the interior space, to permit insertion of the valve mechanism into the second portion of the interior space; and wherein the valve mechanism includes a valve cap which sealingly closes the valve insertion opening.

11. The heat exchanger assembly of claim 1, wherein the valve mechanism comprises a spool member having an annular end portion on which the first valve seat is provided; and wherein each of the second valve seat and the third valve seat comprise an annular shoulder formed by a reduction in diameter in the second portion of the interior space.

12. The heat exchanger assembly of claim 1, wherein the temperature responsive actuator comprises a generally cylindrical actuator body having a first end and a second end, wherein the first valve member is provided at the first end of the actuator and the second valve member is provided at the second end of the actuator;

wherein the valve mechanism further comprises a second spring member in the form of a coil spring extending longitudinally from the second end of the valve actuator and through the second portion of the interior space toward the third valve seat;
wherein the second spring member opposes longitudinal motion of the second valve member toward the second valve seat, and opposes longitudinal motion of the first valve member toward the first valve seat;
wherein the second spring member has a first end secured to the second end of the valve actuator, and an opposed second end secured to a first end of the third valve member.

13. The heat exchanger assembly of claim 12, wherein the third valve member has a first end with an annular sealing surface which is adapted to sealingly engage the third valve seat.

14. The heat exchanger assembly of claim 1, wherein the valve mechanism has an initial cold state in which the temperature responsive actuator is not actuated;

wherein, with the valve mechanism in the cold state, the first valve member is in sealed engagement with the first valve seat, thereby preventing fluid communication between the third oil port and the fifth oil port through the first valve opening; and
wherein, with the valve mechanism in the cold state, the second valve member is longitudinally spaced apart from the second valve seat to permit fluid communication between the second oil port and the fifth oil port through the second valve opening.

15. The heat exchanger assembly of claim 1, wherein the valve mechanism has a hot state in which the temperature responsive actuator is actuated by the first fluid flowing through the valve chamber being above a threshold temperature;

wherein, with the valve mechanism in the hot state, the first valve member is longitudinally spaced apart from the first valve seat, thereby permitting fluid communication between the third oil port and the fifth oil port through the first valve opening; and
wherein, with the valve mechanism in the hot state, the second valve member is in sealed engagement with the second valve seat, to prevent fluid communication between the second oil port and the fifth oil port through the second valve opening.

16. The heat exchanger assembly of claim 15 wherein, with the valve mechanism in the hot state, the temperature responsive actuator acts against the bias of the first and second spring members.

17. The heat exchanger assembly of claim 1, wherein the third valve member is biased toward the closed position by the second spring member to block the third valve opening whether the valve mechanism is in a cold state in which the temperature responsive actuator is not actuated, or in a hot state in which the temperature responsive actuator is actuated by the first fluid flowing through the valve chamber being above a threshold temperature, such that fluid communication between the first and second portions of the interior space is prevented.

18. The heat exchanger assembly of claim 17, wherein the third valve member is pressure actuated by a high pressure condition in which a pressure differential between the first and second portions of the interior space is sufficiently high to compress the second spring member and force the third valve member out of engagement with the third valve seat, thereby opening the third valve opening and providing fluid communication between the first and second portions of the interior space through the third portion of the interior space.

19. A fluid circulation system in a motor vehicle, comprising:
- the heat exchanger assembly of claim 1, wherein the heat exchanger is a transmission oil heater having coolant inlet and outlet ports, the first fluid is transmission oil and the second fluid is engine coolant;
- an internal combustion engine having coolant inlet and outlet ports;
- said first remote vehicle component, comprising a transmission oil cooler;
- said second remote vehicle component, comprising a transmission;
- a pair of transmission oil conduits connecting the third and fourth fluid ports of the valve integration unit to the transmission oil cooler;
- a pair of transmission oil conduits connecting the fifth and sixth fluid ports of the valve integration unit to the transmission;
- a pair of coolant conduits connecting the coolant inlet and outlet ports of the internal combustion engine to the coolant inlet and outlet ports of the transmission oil heater.

* * * * *